United States Patent
Krause et al.

(10) Patent No.: US 10,151,614 B2
(45) Date of Patent: *Dec. 11, 2018

(54) SELF-FILLING GRADUATED CYLINDER SYSTEM

(71) Applicant: Cleaning Systems, Inc., DePere, WI (US)

(72) Inventors: David R. Krause, DePere, WI (US); Patrick A. Fredrickson, DePere, WI (US); Kenneth R. Smith, Hobart, WI (US)

(73) Assignee: Cleaning Systems, Inc., DePere, WI (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/787,315

(22) Filed: Oct. 18, 2017

(65) Prior Publication Data

US 2018/0038725 A1  Feb. 8, 2018

Related U.S. Application Data

(63) Continuation-in-part of application No. 15/332,063, filed on Oct. 24, 2016, which is a continuation-in-part
(Continued)

(51) Int. Cl.
*G01F 23/02* (2006.01)
*G01F 19/00* (2006.01)
(Continued)

(52) U.S. Cl.
CPC ............... *G01F 23/02* (2013.01); *B01L 3/56* (2013.01); *B01L 3/563* (2013.01); *G01F 19/00* (2013.01);
(Continued)

(58) Field of Classification Search
CPC ........... G01F 23/02; G01F 19/00; G01F 22/00
See application file for complete search history.

(56) References Cited

U.S. PATENT DOCUMENTS 2,526,784 A * 10/1950 Walker .................... G01F 23/66
141/344
4,235,265 A * 11/1980 Feliks .................... B65B 55/02
141/264
(Continued)

FOREIGN PATENT DOCUMENTS

CN  201524254 U * 7/2010
CN  205251528 U * 5/2016
(Continued)

OTHER PUBLICATIONS http://www.diamondshine.com/wp-content/uploads/2015/08/Bullseye_info-sheet.pdf; Bullseye DiamondShine Info Sheet; Received and Printed Apr. 25, 2016.
(Continued)

*Primary Examiner* — Lisa Caputo
*Assistant Examiner* — Jamel Williams
(74) *Attorney, Agent, or Firm* — Neustel Law Offices

(57) ABSTRACT

A self-filling graduated cylinder system for efficiently filling a graduated cylinder with a chemical solution. The self-filling graduated cylinder system generally includes a graduated cylinder having an interior, an upper end, an upper opening in the upper end a lower end opposite of the upper end, and a check valve attached to the graduated cylinder near the lower end of the graduated cylinder. The check valve is adapted to allow a liquid chemical to flow upwardly through the check valve into the graduated cylinder and to prevent the liquid chemical within the interior of the graduated cylinder from flowing downwardly through the check valve. A vacuum device is fluidly connected to the graduated cylinder to draw the liquid chemical upwardly to an upper
(Continued)

level within the graduated cylinder. Alternatively, a pump device pumps liquid chemical into the graduated cylinder.

19 Claims, 35 Drawing Sheets

Related U.S. Application Data of application No. 15/139,036, filed on Apr. 26, 2016, now Pat. No. 9,476,748.

(51) Int. Cl.
    *G01F 22/00*     (2006.01)
    *G01F 23/00*     (2006.01)
    *B01L 3/00*     (2006.01)

(52) U.S. Cl.
    CPC .......... *G01F 22/00* (2013.01); *G01F 23/0046* (2013.01); *B01L 2200/0605* (2013.01); *B01L 2300/028* (2013.01); *B01L 2300/0832* (2013.01)

(56) References Cited

U.S. PATENT DOCUMENTS

| | | | | |
|---|---|---|---|---|
| 4,590,793 A | * | 5/1986 | Staats, Jr. | ............... G01M 3/26 |
| | | | | 73/40 |
| 4,905,744 A | * | 3/1990 | Siegrest | ................... B65B 3/32 |
| | | | | 141/117 |
| 5,186,180 A | * | 2/1993 | Bellas | ................... A61B 5/1076 |
| | | | | 33/512 |
| 5,301,845 A | * | 4/1994 | Labonte | ............... B05B 11/047 |
| | | | | 222/211 |
| 5,758,799 A | * | 6/1998 | Patterson | ............ A01M 7/0092 |
| | | | | 137/891 |
| 6,045,010 A | * | 4/2000 | Patterson | ............ A01M 7/0092 |
| | | | | 141/65 |
| 6,168,069 B1 | * | 1/2001 | Lorenz | ................. B23K 1/0008 |
| | | | | 228/121 |
| D740,390 S | | 10/2015 | Soble | |
| 9,476,748 B1 | * | 10/2016 | Krause | .................... G01F 17/00 |
| 2007/0157706 A1 | * | 7/2007 | Yanagi | .................. G01M 3/002 |
| | | | | 73/49.2 |
| 2008/0124186 A1 | * | 5/2008 | Binz | ..................... G01F 1/8413 |
| | | | | 411/378 |
| 2010/0145297 A1 | * | 6/2010 | Aguilo-Pinedo | ..... A61J 7/0046 |
| | | | | 604/404 |
| 2013/0330244 A1 | * | 12/2013 | Balaban | ................. A61K 33/00 |
| | | | | 422/225 |

FOREIGN PATENT DOCUMENTS

| | | | | |
|---|---|---|---|---|
| EP | 1840281 A1 | * | 10/2007 | ............ E03D 9/038 |
| RU | 2155627 C1 | * | 9/2000 | |
| WO | WO 2004016869 A1 | * | 2/2004 | ............... E03D 1/14 |

OTHER PUBLICATIONS http://www.diamondshine.com/?page_id=1588; Bullseye DiamondShine Product Webpage; Received and Printed Apr. 25, 2016.

* cited by examiner

SELF-FILLING GRADUATED CYLINDER SYSTEM

CROSS REFERENCE TO RELATED APPLICATIONS

The present application is a continuation-in-part of U.S. application Ser. No. 15/332,063 filed on Oct. 24, 2016, which is a continuation-in-part of U.S. application Ser. No. 15/139,036 filed on Apr. 26, 2016 now issued as U.S. Pat. No. 9,476,748. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a self-filling graduated cylinder system for efficiently filling a graduated cylinder with a liquid chemical.

Related Art

Any discussion of the related art throughout the specification should in no way be considered as an admission that such related art is widely known or forms part of common general knowledge in the field.

In various industries, it is important to measure the volume of liquid chemical being used during a particularly period of time to ensure that the system is operating as intended. One example of an industry that will periodically check the liquid chemical usage in a period of time is the vehicle wash industry. In the vehicle wash industry, the operator of a vehicle wash will want to accurately measure the volume of liquid vehicle wash chemicals (e.g. presoaks, detergents, foaming solution, surface treatments, wax, clear coats, conditions, rinse, rust inhibitor, tire cleaner, degreaser, engine cleaner, etc.) used during a wash cycle to ensure that the proper amount of liquid chemical is being used during the wash cycle. Based on the measurement of liquid chemical used, the vehicle wash operator can then adjust the vehicle wash to increase, decrease or remain the same the usage of liquid chemical. While vehicle washes are used as an example, various other industries may benefit from the usage of the various embodiments shown herein.

In the vehicle wash industry, to measure the amount of liquid vehicle wash chemical used, the user removes a volume of the liquid vehicle wash chemical from a container (e.g. pump or other removal means) and dispenses the liquid vehicle wash chemical into a graduated cylinder. The user then inserts a chemical inlet line into the graduated cylinder to draw the liquid vehicle wash chemical from the graduated cylinder. The user then operates the vehicle wash with a single vehicle wash cycle or multiple vehicle wash cycles. The user determines how much liquid vehicle wash chemical was used per cycle by dividing the number of cycles into the volume of liquid vehicle wash chemical used. This data is then used to calibrate the vehicle wash. The user then pours the unused liquid vehicle wash chemical back into the original container.

SUMMARY

An example embodiment of the present invention is directed to a self-filling graduated cylinder system. The self-filling graduated cylinder system includes a graduated cylinder having an interior, an upper end, an upper opening in the upper end a lower end opposite of the upper end, and a check valve attached to the graduated cylinder near the lower end of the graduated cylinder. The check valve is adapted to allow a liquid chemical to flow upwardly through the check valve into the graduated cylinder and to prevent the liquid chemical within the interior of the graduated cylinder from flowing downwardly through the check valve.

There has thus been outlined, rather broadly, some of the features of the self-filling graduated cylinder system in order that the detailed description thereof may be better understood, and in order that the present contribution to the art may be better appreciated. There are additional features of the self-filling graduated cylinder system that will be described hereinafter and that will form the subject matter of the claims appended hereto. In this respect, before explaining at least one embodiment of the self-filling graduated cylinder system in detail, it is to be understood that the self-filling graduated cylinder system is not limited in its application to the details of construction or to the arrangements of the components set forth in the following description or illustrated in the drawings. The self-filling graduated cylinder system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
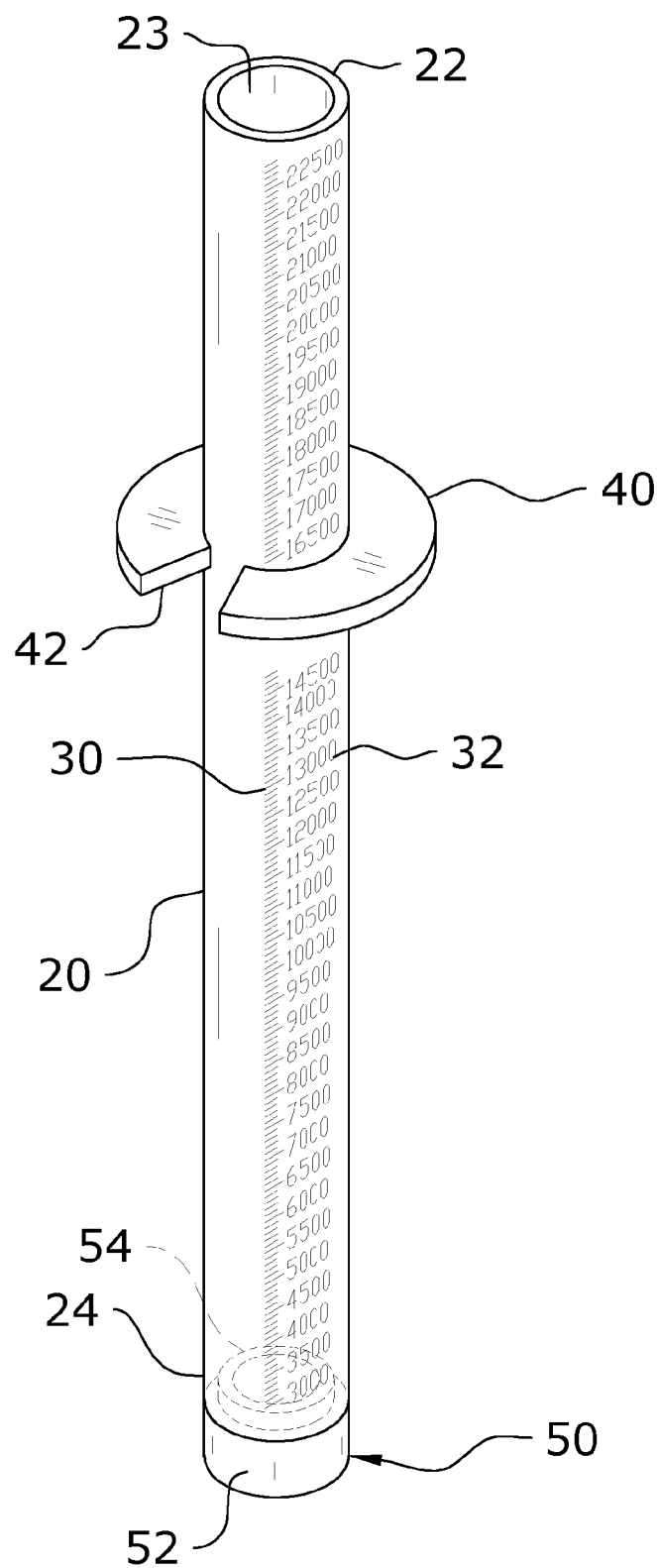
FIG. 1 is an upper perspective view of a self-filling graduated cylinder in accordance with an example embodiment.
Figure 2:
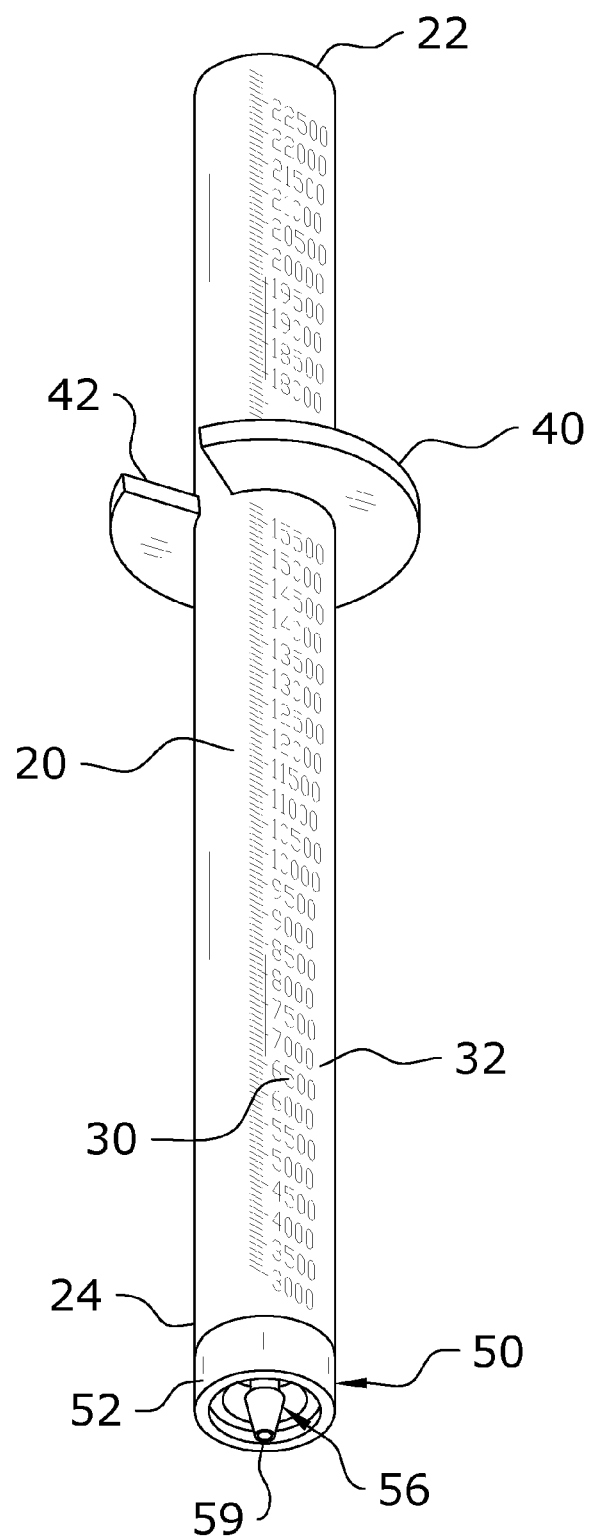
FIG. 2 is a lower perspective view of the self-filling graduated cylinder.
Figure 3:
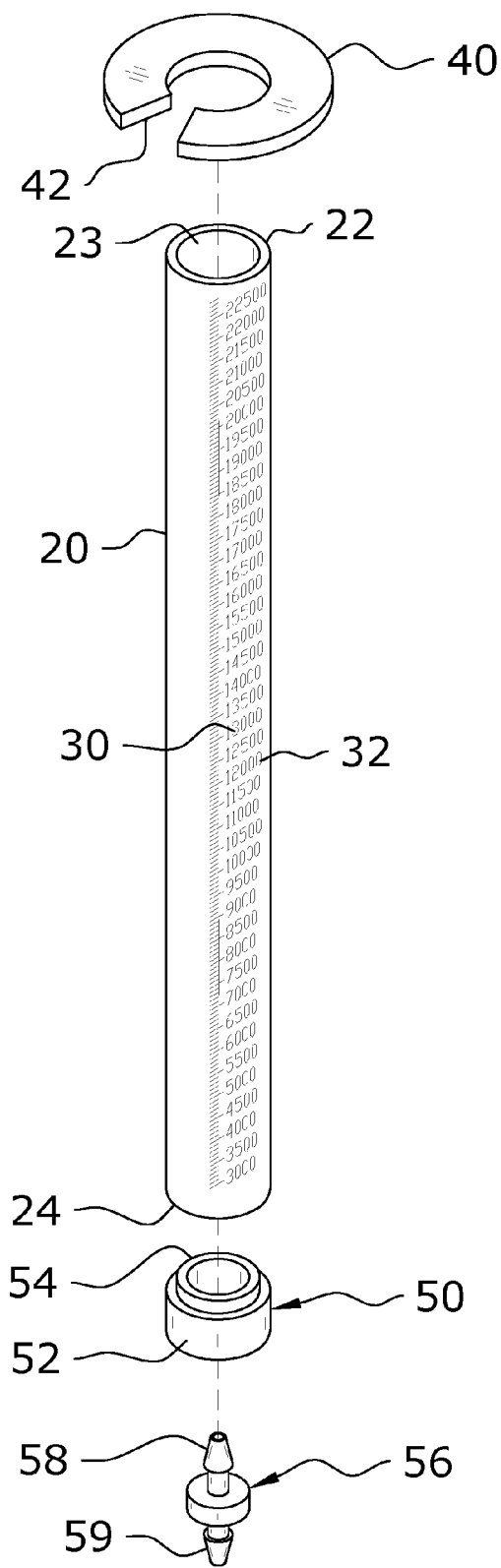
FIG. 3 is an exploded upper perspective view of the self-filling graduated cylinder.

A. Overview.

An example self-filling graduated cylinder system generally comprises a graduated cylinder 20 having an interior, an upper end 22, an upper opening 23 in the upper end 22 a lower end 24 opposite of the upper end 22, and a check valve 56 attached to the graduated cylinder 20 near the lower end 24 of the graduated cylinder 20. The check valve 56 is adapted to allow a liquid chemical 12 to flow upwardly through the check valve 56 into the graduated cylinder 20 and to prevent the liquid chemical 12 within the interior of the graduated cylinder 20 from flowing downwardly through the check valve 56.

B. Chemical Consuming Device.

The chemical consuming device 16 is preferably comprised of a vehicle wash used to wash vehicles (e.g. cars, trucks, semi-trucks, boats and the like). Various embodiments of the present invention are described herein as being used within the vehicle wash industry, but it can be appreciated that the embodiments of the present invention may be used in various other industries to measure liquid chemical 12 consumption and various other types of liquids other than vehicle wash chemicals. For example, the present invention may be used to measure the volume of oil used to lubricate a component of a machine used in manufacturing. As another alternative example, the present invention may be used to measure the volume of cooking oil used by an appliance during the cooking process of a food item. Various other chemical consuming devices 16 in various other industries may benefit from the various embodiments of the present invention.

C. Graduated Cylinder.

FIGS. 1 through 4 illustrate an exemplary embodiment of a graduated cylinder 20 for measuring a volume of liquid chemical 12 consumption by the chemical consuming device 16. The graduated cylinder 20 has an interior to receive a volume of liquid chemical 12. The interior of the graduated cylinder 20 may hold various volumes of liquid chemical 12, such as, but not limited to, 10 ml, 25 ml, 50 ml or 100 ml. The graduated cylinder 20 may be constructed of various types of materials such as, but not limited to, glass or plastic.

The graduated cylinder 20 is not physically attached to the chemical container 10 used for the chemical consuming device 16 as the graduated cylinder 20 is a separate device used to be inserted into one or more chemical containers 10. The chemical containers 10 may be comprised of various structures such as a tank, a barrel with a ceiling 11 having an opening closable with a plug, a jug and the like. Examples of chemical containers 10 are containers used in vehicle washes to store liquid vehicle wash chemicals for usage by the vehicle wash. While not required, the various embodiments of the present invention are preferably used with respect to chemical containers 10 used in a vehicle wash. The chemical containers 10 used in a vehicle wash store various types of liquid chemicals 12 (e.g. presoaks, detergents, foaming solution, surface treatments, wax, clear coats, conditions, rinse, rust inhibitor, tire cleaner, degreaser, engine cleaner, etc.).

The graduated cylinder 20 is comprised of an elongated tubular structure having an upper end 22 and a lower end 24 opposing the upper end 22. The graduated cylinder 20 may have various lengths. The upper end 22 of the graduated cylinder 20 includes an upper opening 23 used for dispensing any remaining liquid chemical 12 in the graduated cylinder 20 back into the chemical container 10.

The graduated cylinder 20 preferably has a circular cross sectional shape forming a conventional cylinder shape. The graduated cylinder 20 has at least one sidewall and may have a plurality of sidewalls. However, the graduated cylinder 20 may have various other types of cross sectional shapes such as, but not limited to, oval, square, rectangular, triangular and the like.

At least a portion of the graduated cylinder 20 is preferably comprised of a transparent or semi-transparent material to allow for viewing of the liquid chemical 12 within the graduated cylinder 20. It is preferable that a substantial portion of the graduated cylinder 20 is comprised of a transparent or semi-transparent material, however, it is possible that a vertical strip is transparent (or semi-transparent) with the remaining portion opaque.

Figure 4:
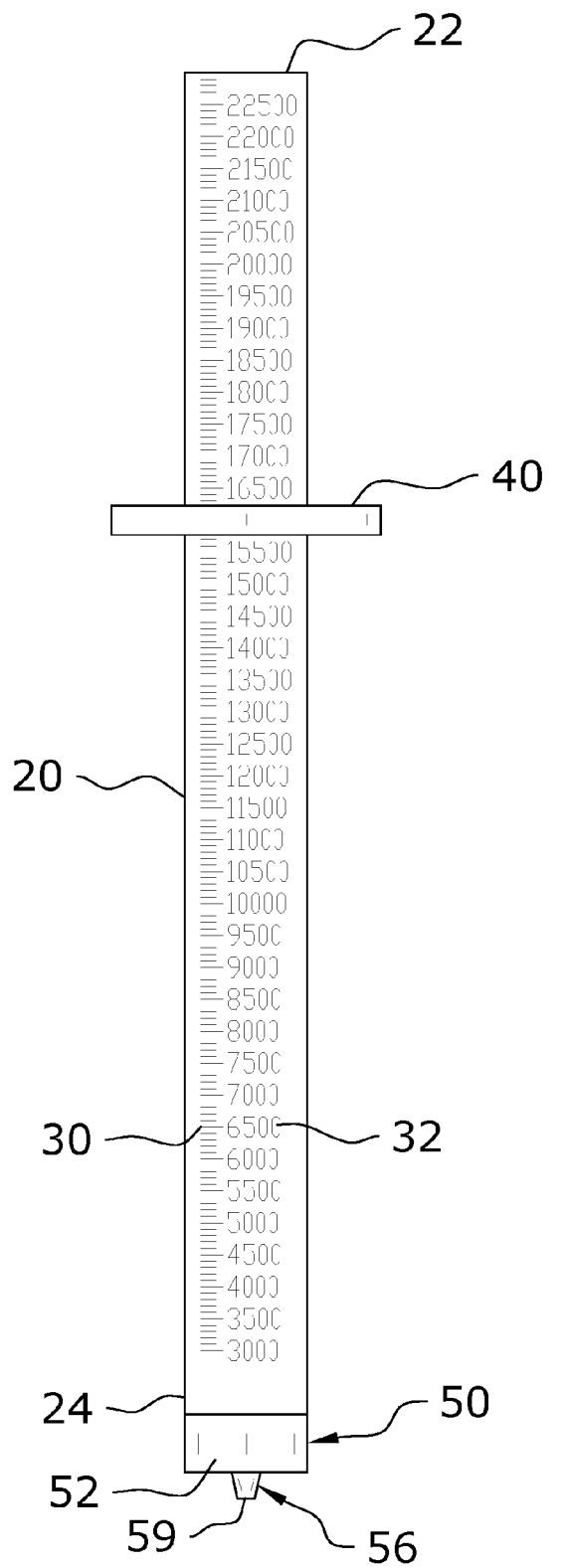
FIG. 4 is a front view of the self-filling graduated cylinder.
Figure 5:
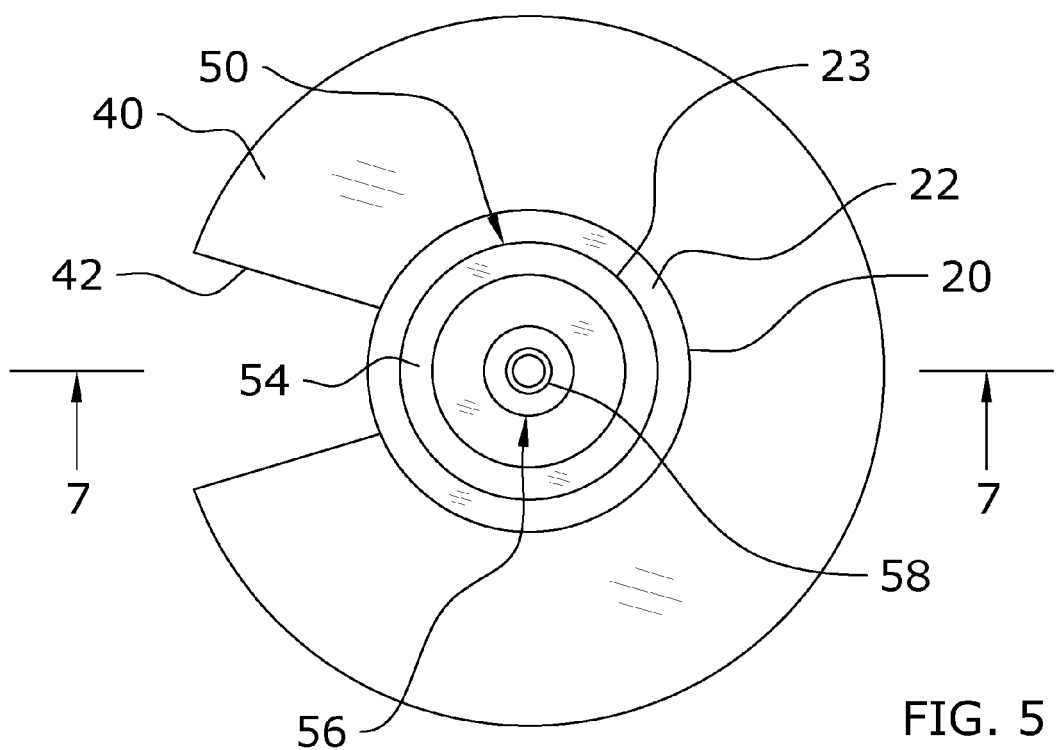
FIG. 5 is a top view of the self-filling graduated cylinder.
Figure 6:
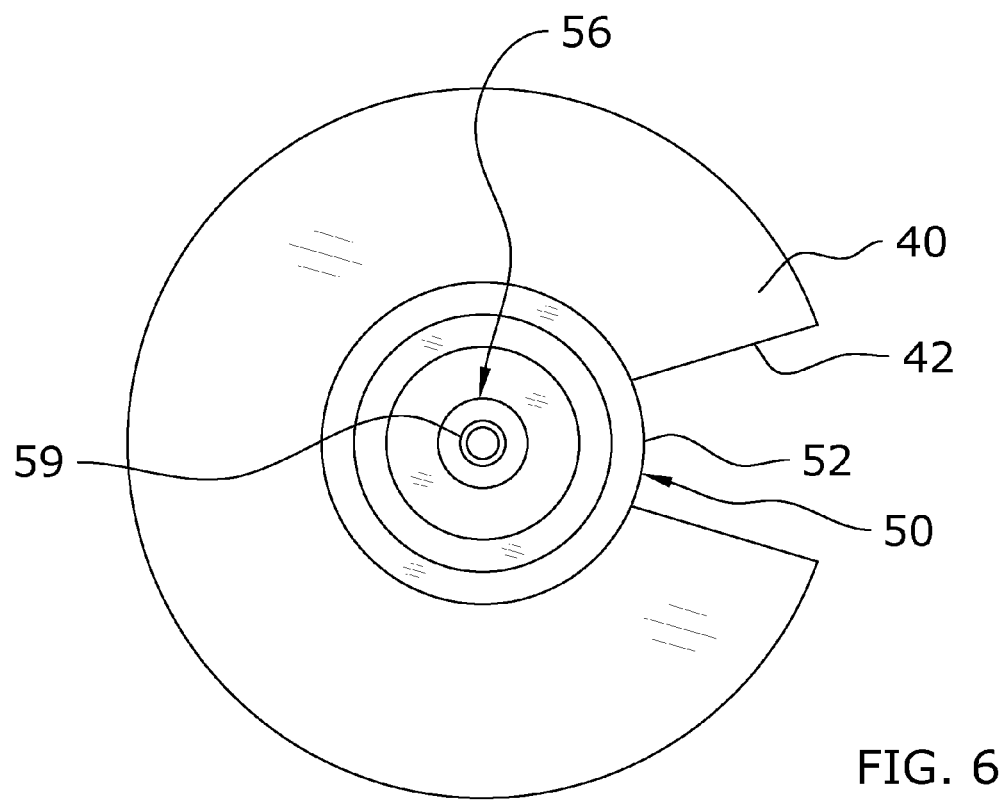
FIG. 6 is a bottom view of the self-filling graduated cylinder.
Figure 7:
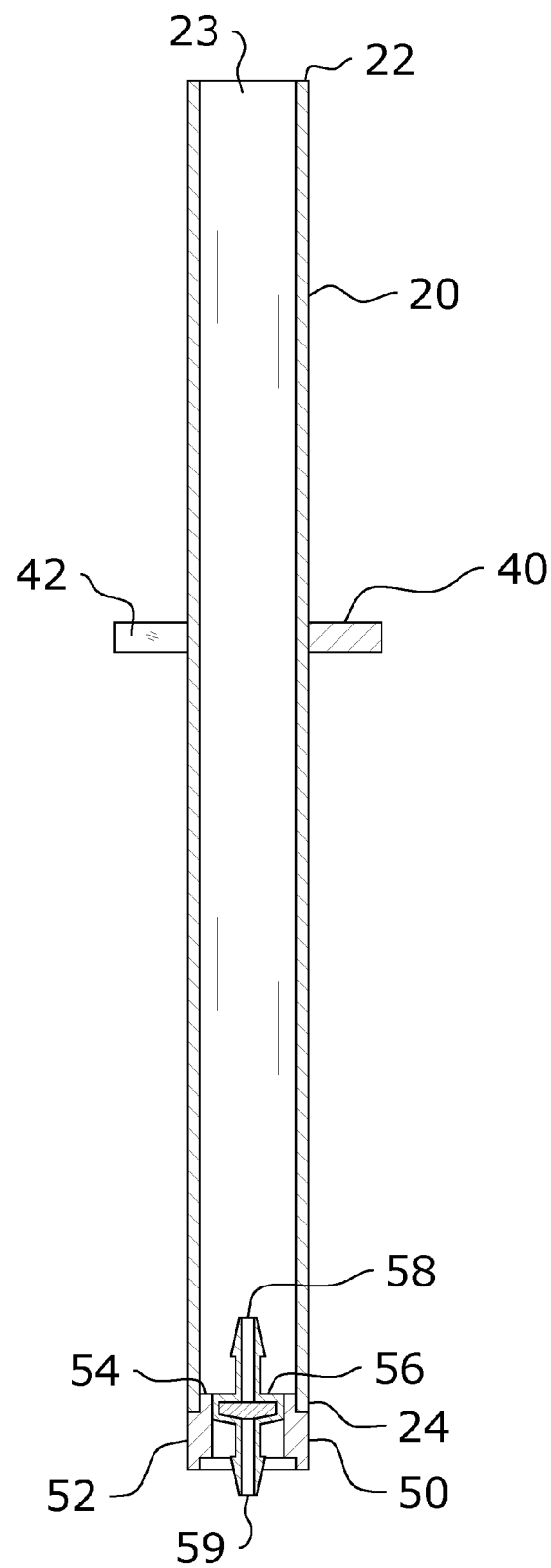
FIG. 7 is a cross sectional view taken along line 7-7 of FIG. 5.

The graduated cylinder 20 preferably includes a plurality of line markings 30 that are horizontally orientated to indicate a volume of liquid chemical 12 in the graduated cylinder 20 at a certain location. The graduated cylinder 20 further preferably includes a plurality of measurement indicia 32 corresponding to the plurality of line markings 30 as shown in FIG. 4 of the drawings.

D. Check Valve.

A check valve 56 is attached to the graduated cylinder 20 near the lower end 24 of the graduated cylinder 20. The check valve 56 may be comprised of various types of valves that allow for the flow of liquid chemical 12 in one direction (sometimes referred to as a "one-way valve" or "free flow check valves 56"). In the various embodiments of the present invention, the check valve 56 is preferably adapted to allow for only the inward flow of liquid chemical 12 from outside of the graduated cylinder 20 into the interior of the graduated cylinder 20 to partially fill the graduated cylinder 20 (e.g. upwardly flow from the lower end 24; inward side flow if the check valve 56 is positioned on the sidewall of the graduated cylinder 20). When the graduated cylinder 20 is removed from the chemical container 10, the check valve 56 prevents the outflow of the liquid chemical 12 in the interior of the graduated cylinder 20 to outside of the graduated cylinder 20.

Figure 8A:
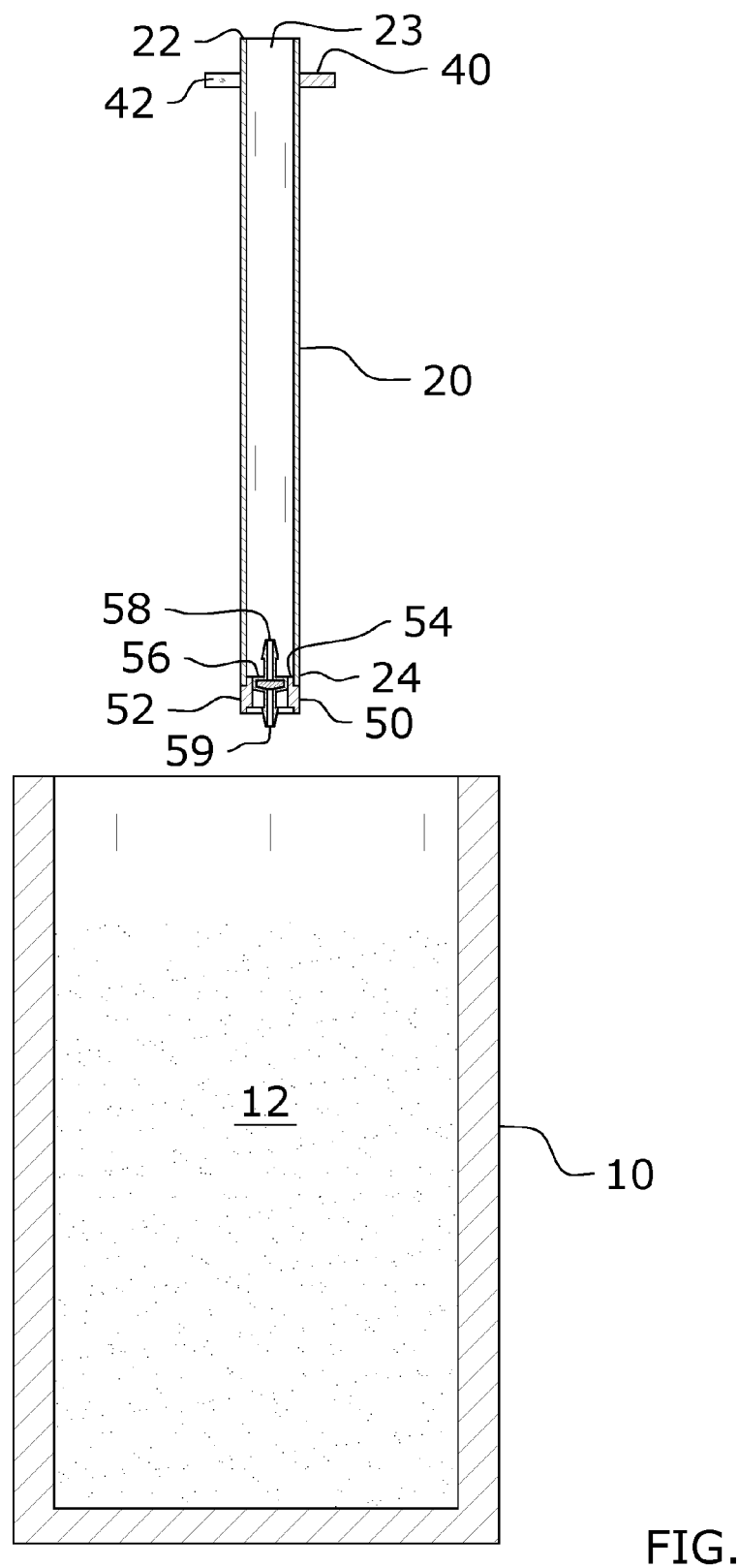
FIG. 8a is a front cross sectional view showing the self-filling graduated cylinder positioned above a chemical container.
Figure 8B:
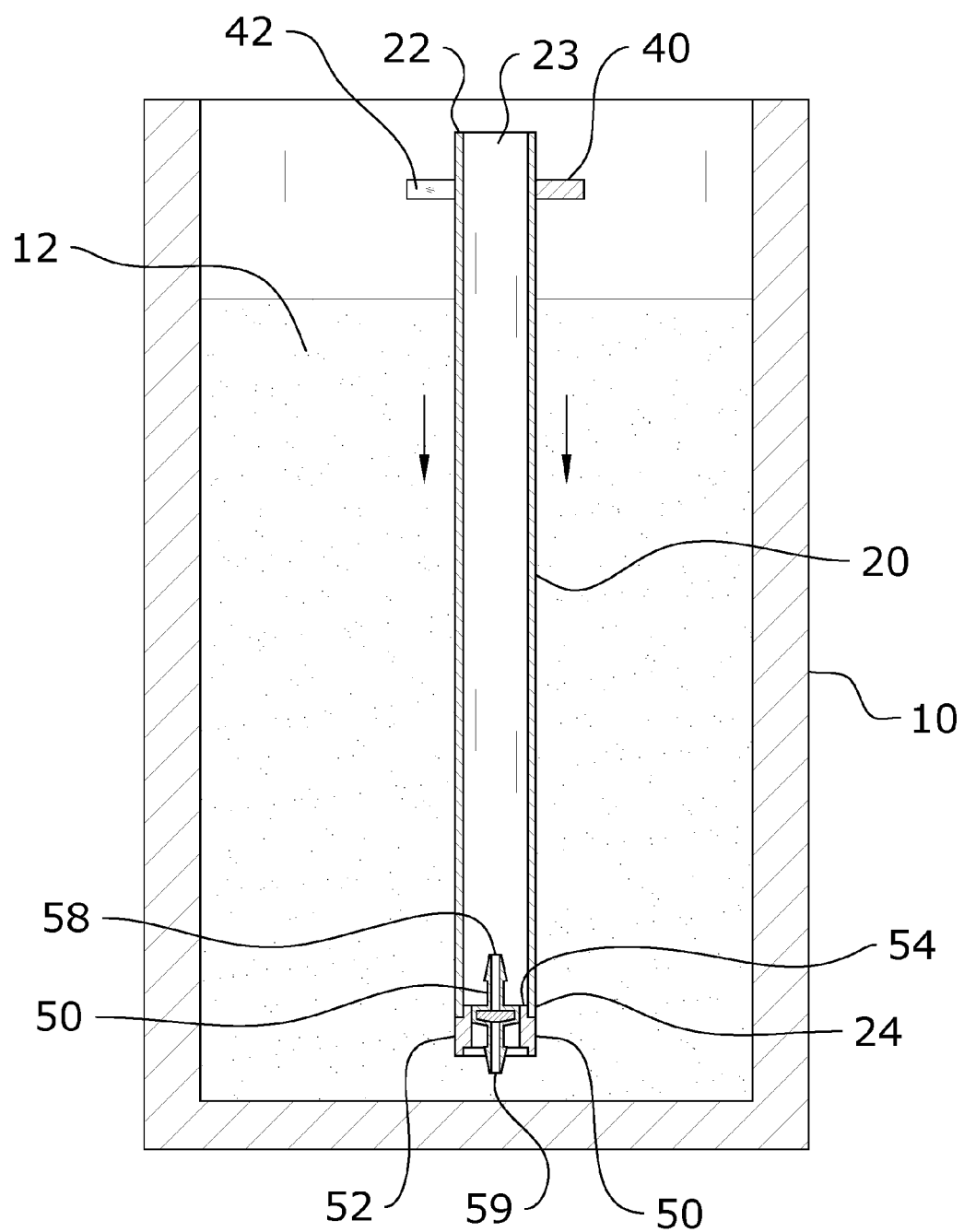
FIG. 8b is a front cross sectional view showing the self-filling graduated cylinder positioned inside of the chemical container initially.
Figure 8C:
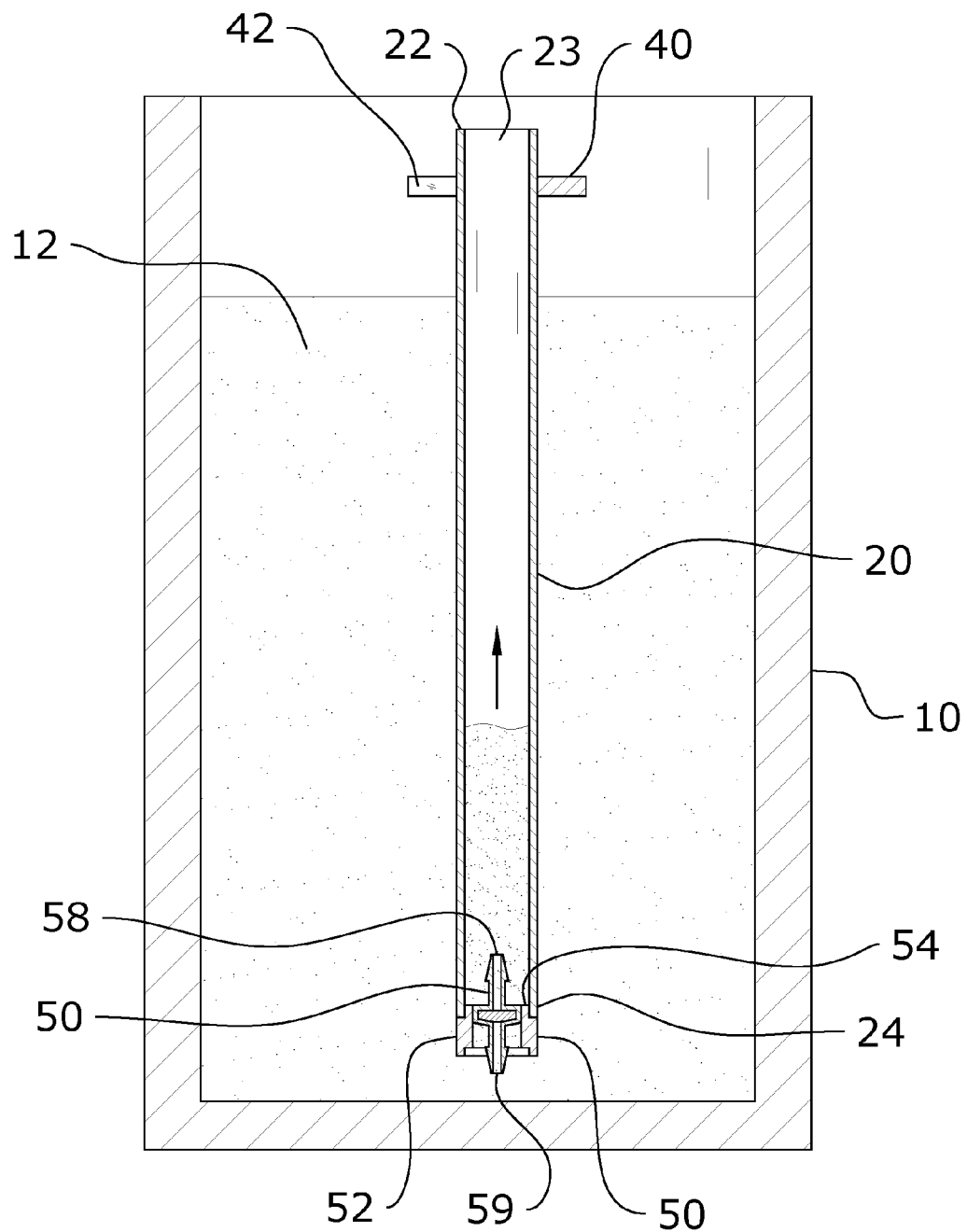
FIG. 8c is a front cross sectional view showing the self-filling graduated cylinder positioned inside of the chemical container showing the liquid chemical entering the interior of the graduated cylinder through the check valve.
Figure 8D:
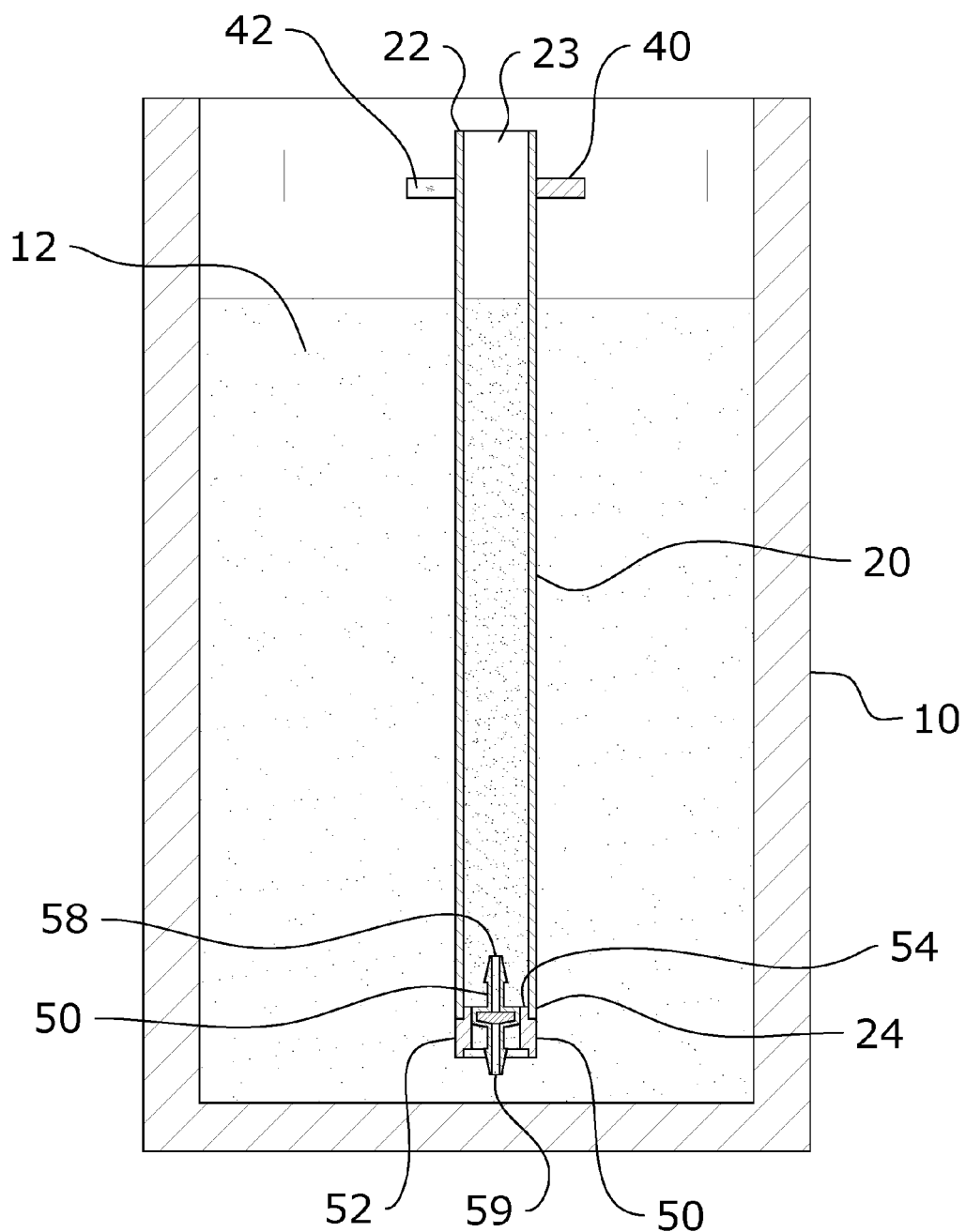
FIG. 8d is a front cross sectional view showing the self-filling graduated cylinder positioned inside of the chemical container with the level of liquid chemical in the graduated cylinder equalized with the level of liquid chemical in the chemical tank.
Figure 8E:
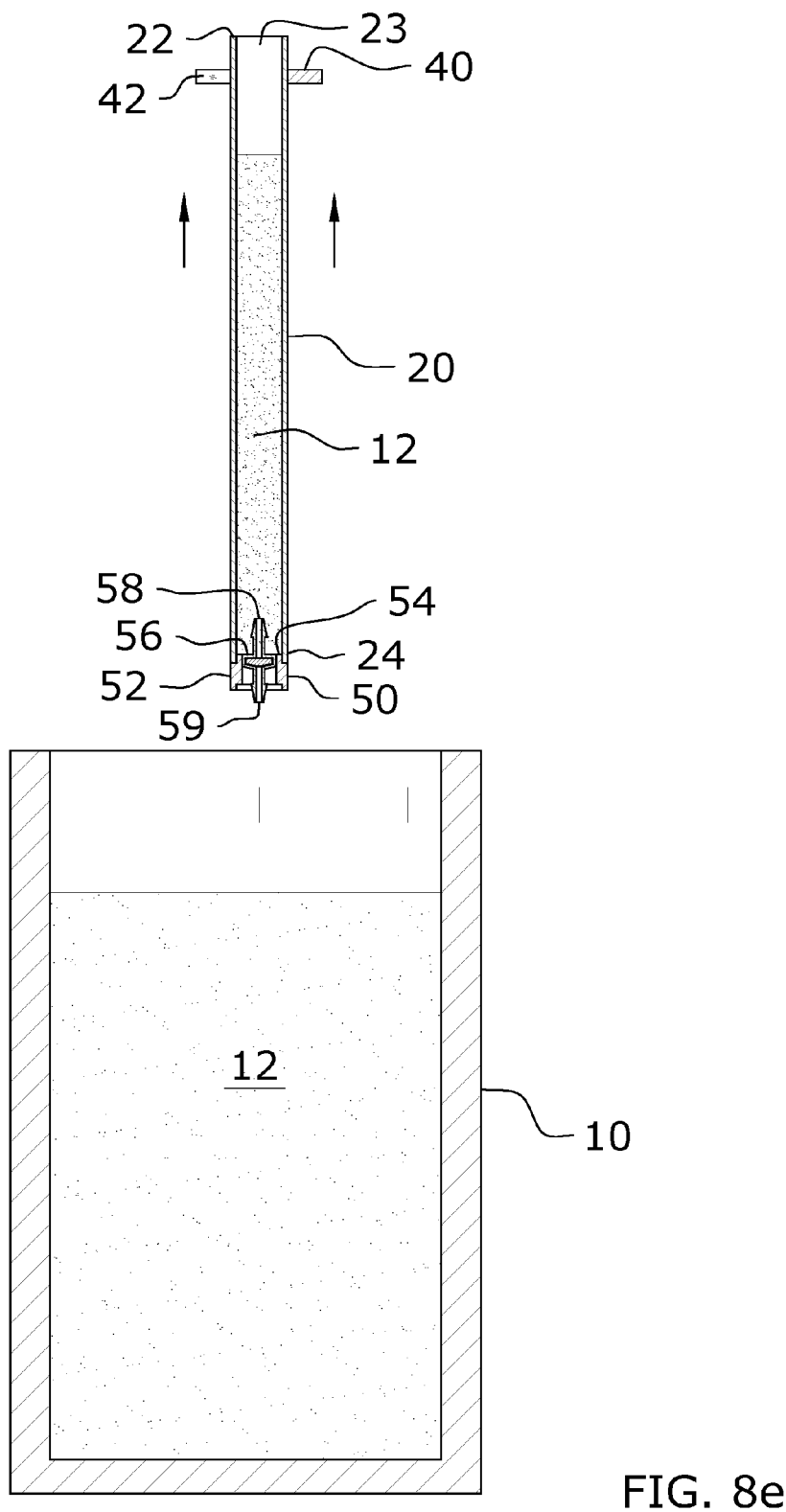
FIG. 8e is a front cross sectional view showing the self-filling graduated cylinder removed from the chemical container and with the check valve retaining the liquid chemical within the graduated cylinder.

In one embodiment, the check valve 56 is preferably adapted to allow the liquid chemical 12 from the chemical container 10 to flow upwardly through the check valve 56 into the graduated cylinder 20 when the lower end 24 of the graduated cylinder 20 is inserted below the upper level of the liquid chemical 12 in the chemical container 10 as illustrated in FIGS. 8b and 8c of the drawings. In this embodiment, the check valve 56 is further preferably adapted to prevent the liquid chemical 12 within the interior of the graduated cylinder 20 from flowing downwardly through the check valve 56.

The check valve 56 may be directly attached to the graduated cylinder 20 or the check valve 56 may be attached within a valve unit 50 that is attached to the graduated cylinder 20. The valve unit 50 includes a valve housing 52 surrounding at least a portion of the check valve 56 and an upper connecting end 54 that extends into the interior of the graduated cylinder 20. The upper connecting end 54 is narrower than the lower end 24 of the graduated cylinder 20 and frictionally extends into the opening in the lower end 24 of the graduated cylinder 20. The valve housing 52 is attached to the interior surface of the graduated cylinder 20.

The check valve 56 includes an inlet port 59 and an outlet port 58. The inlet port 59 is adapted to allow the liquid chemical 12 from outside of the graduated cylinder 20 to enter the check valve 56 and the outlet port 58 is adapted to allow the liquid chemical 12 to escape the check valve 56 into the interior of the graduated cylinder 20. FIG. 8c illustrates the liquid chemical 12 flowing upwardly into the inlet port 59 through the check valve 56 and continuing upwardly through the outlet port 58 into the interior of the graduated cylinder 20. The inlet port 59 and the outlet port 58 are preferably concentrically positioned with respect to the graduated cylinder 20, however, the ports 58, 59 may be offset or positioned within the sidewall of the graduated cylinder 20. The configuration of the check valve 56 in the figures is merely an example and is not intended to be limiting of the structure of the invention in any manner.

The check valve 56 may be comprised of various types of valves that allow for only one-way flow of liquid chemical 12. One example of a preferred check valve 56 is a diaphragm check valve 56 that uses a flexing rubber diaphragm positioned to create a normally-closed valve except when pressure from the upstream side exceeds the downstream side by a certain amount then the check valve 56 opens allowing for the flow of liquid chemical 12. The diaphragm closes when the positive pressure stops or falls below a certain level thereby returning to its original closed position.

Figure 17:
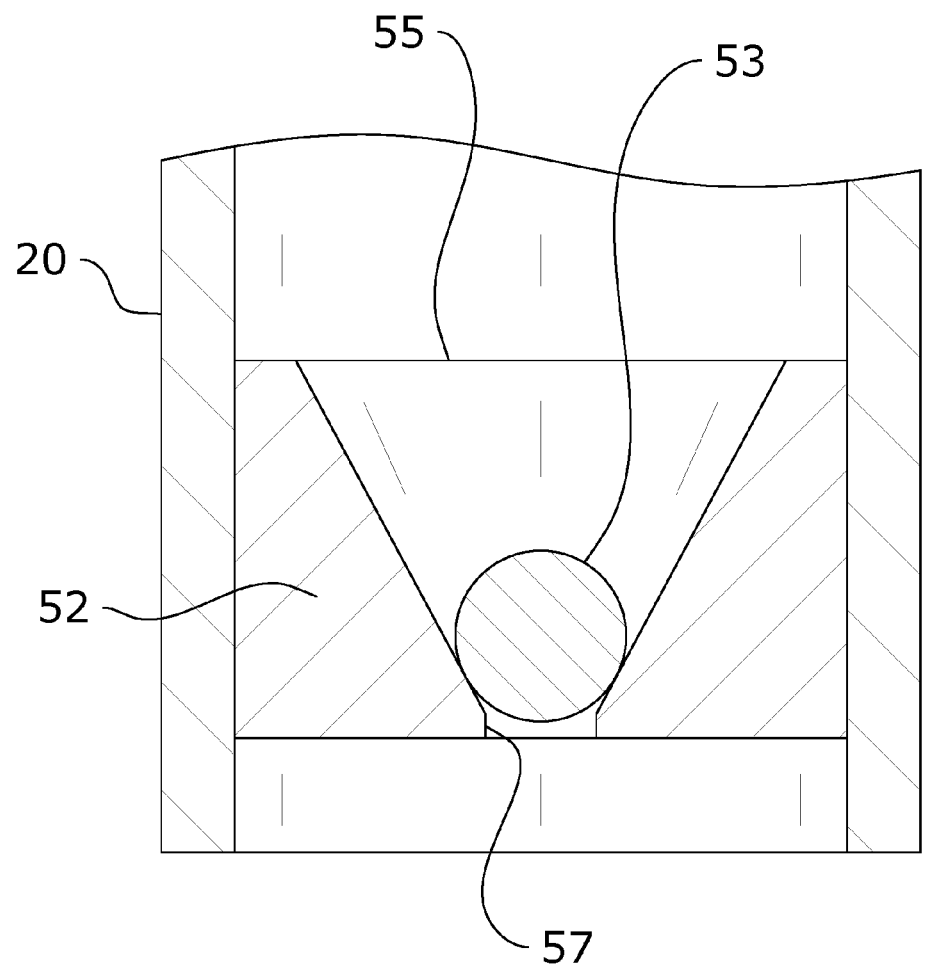
FIG. 17 is a cross sectional view of the ball check valve in FIG. 16 illustrating the check ball.

Another preferably check valve 56 is comprised of a ball check valve 56. The ball check valve 56 includes a check ball 53 and a lower valve opening 57 as illustrated in FIG. 17 of the drawings. The check ball 53 is adapted to seal the lower valve opening 57 in the ball check valve 56 when liquid chemical 12 attempts to flow downwardly through the lower valve opening 57, and the check ball 53 is adapted to open the lower valve opening 57 in the ball check valve 56 when liquid chemical 12 attempts to flow upwardly through the lower valve opening 57. The ball check valve 56 operates in a manner similar to the diaphragm check valve 56 except that a check ball 53 is used instead of a diaphragm. The valve housing 52 preferably includes a tapered portion that tapers toward the lower valve opening 57 as show in FIG. 17. The ball check valve 56 further preferably includes a ball retainer 55 positioned above the lower valve opening 57 to prevent the check ball 53 from entering the graduated cylinder 20 when liquid chemical 12 is flowing into the graduated cylinder 20 as shown in FIG. 17. The ball retainer 55 is comprised of a permeable structure (e.g. screen). The ball check valve 56 preferably does not include a spring to bias the check ball 53 into the closed position, however, a spring may be used.

E. Marker.

Figure 9A:
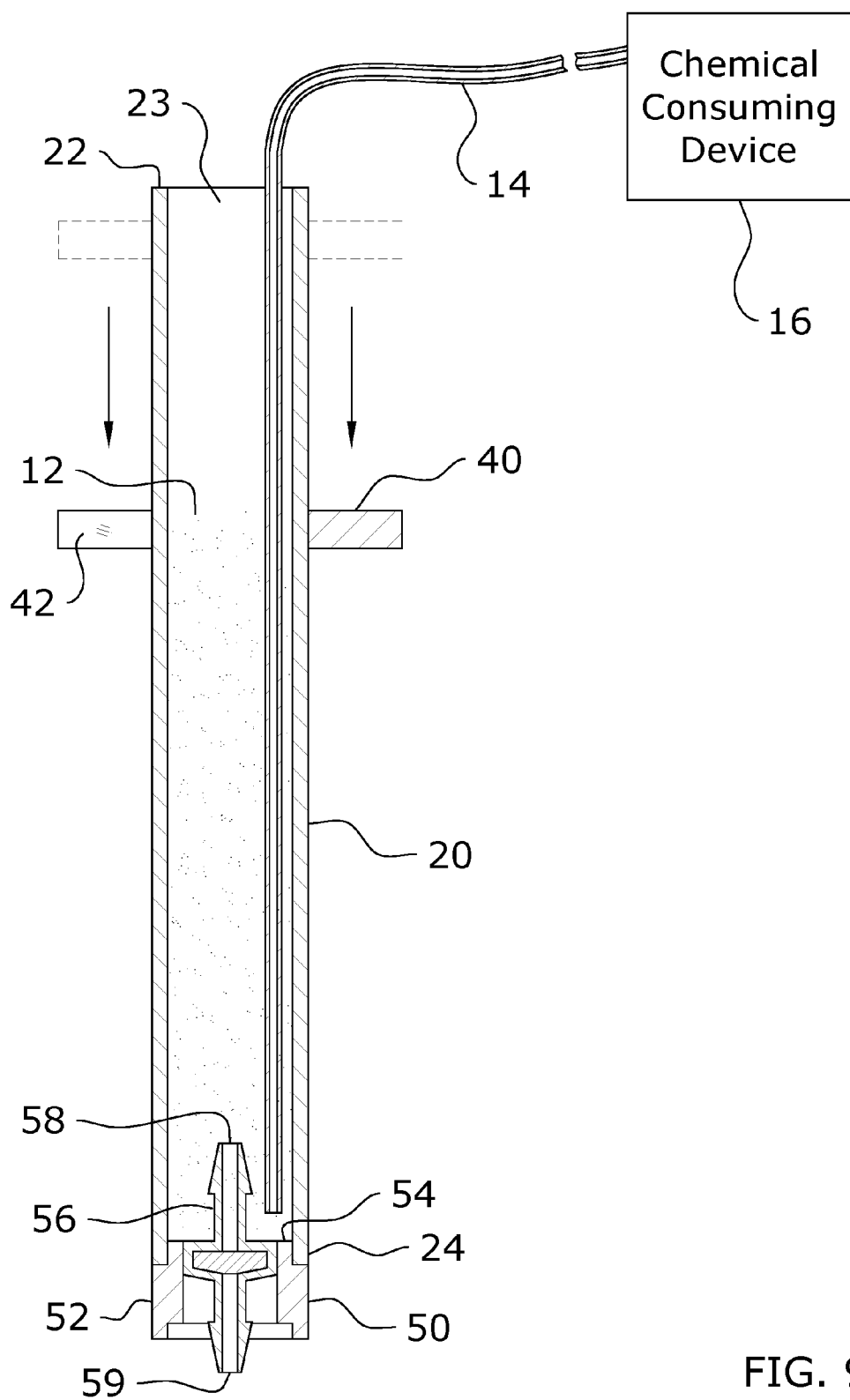
FIG. 9a is a front cross sectional view showing the self-filling graduated cylinder with a chemical inlet line positioned within the graduated cylinder along with the marker moved to the initial chemical level in the graduated cylinder.
Figure 9B:
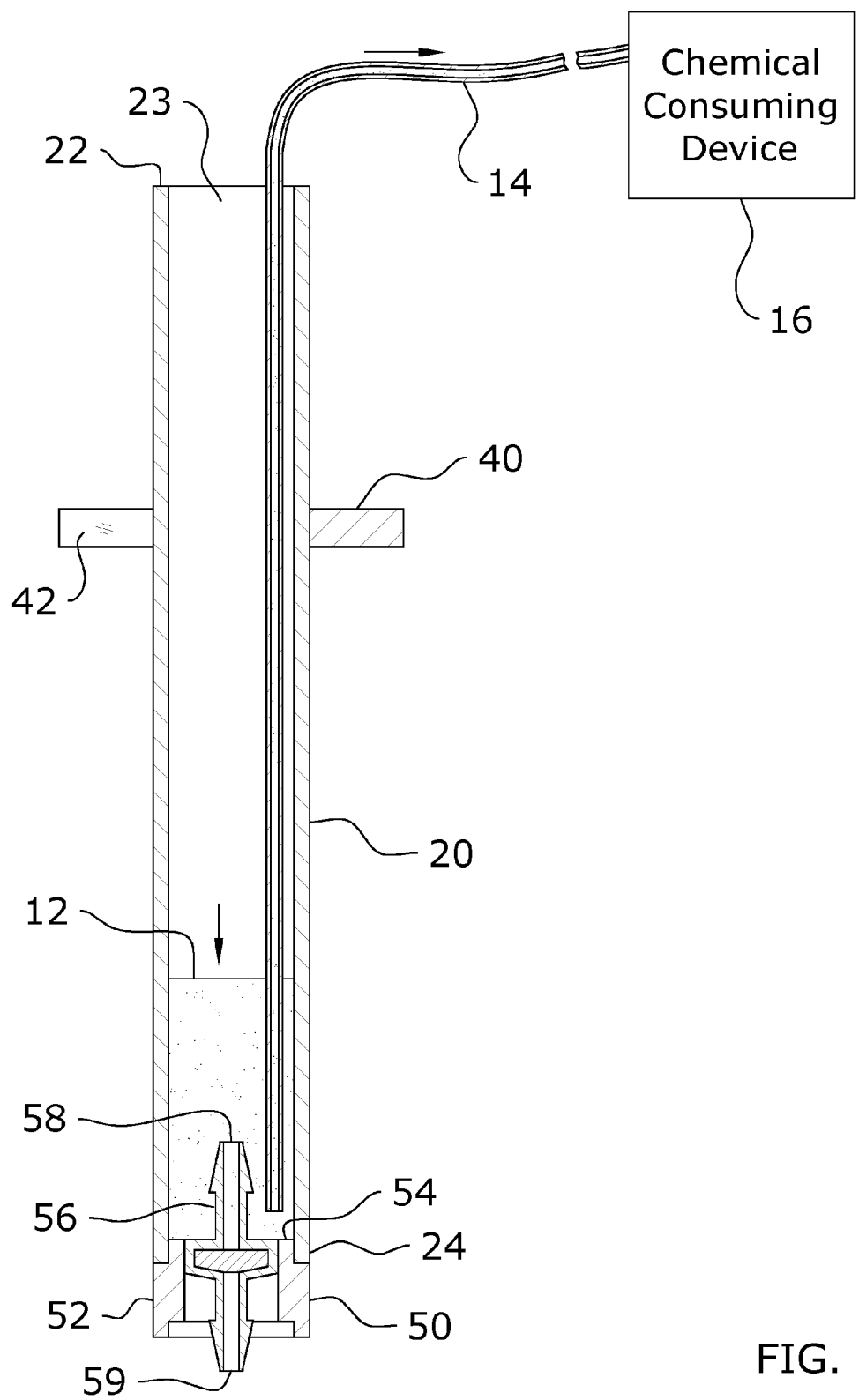
FIG. 9b is a front cross sectional view showing the self-filling graduated cylinder with the chemical inlet line positioned within the graduated cylinder with the liquid chemical level in the graduated cylinder lowered to a final chemical level in the graduated cylinder showing the volume of chemical used during the testing cycle(s).
Figure 10:
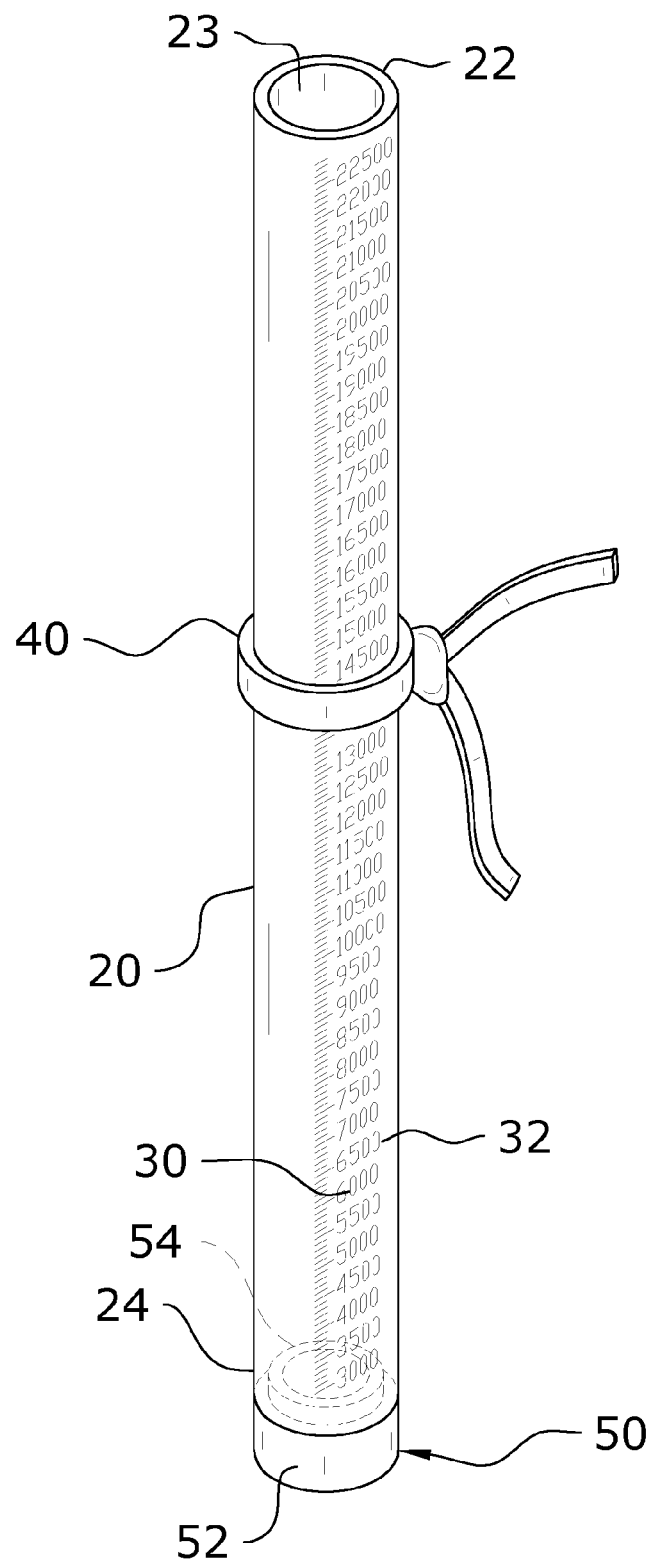
FIG. 10 is an upper perspective view showing an alternative marker positioned upon the graduated cylinder.

One or more markers 40 are movably positioned upon an exterior of the graduated cylinder 20 to mark an initial chemical level in the graduated cylinder 20 as illustrated in FIGS. 1 through 10 and 15 of the drawings. The marker 40 is preferably comprised of a ring marker 40 that frictionally slides up and down along the graduated cylinder 20 as illustrated in FIGS. 1 through 9 and 15 of the drawings. The ring marker 40 further preferably includes a cutout 42 to allow for expansion of the ring marker 40 about the graduated cylinder 20. The marker 40 may also be comprised of an elastic band (e.g. rubber band type of device) tied around the graduated cylinder 20 as shown in FIG. 10 of the drawings. Various other types of markers 40 may be used to visually mark the initial chemical level and/or the final chemical level within the graduated cylinder 20.

Figure 18:
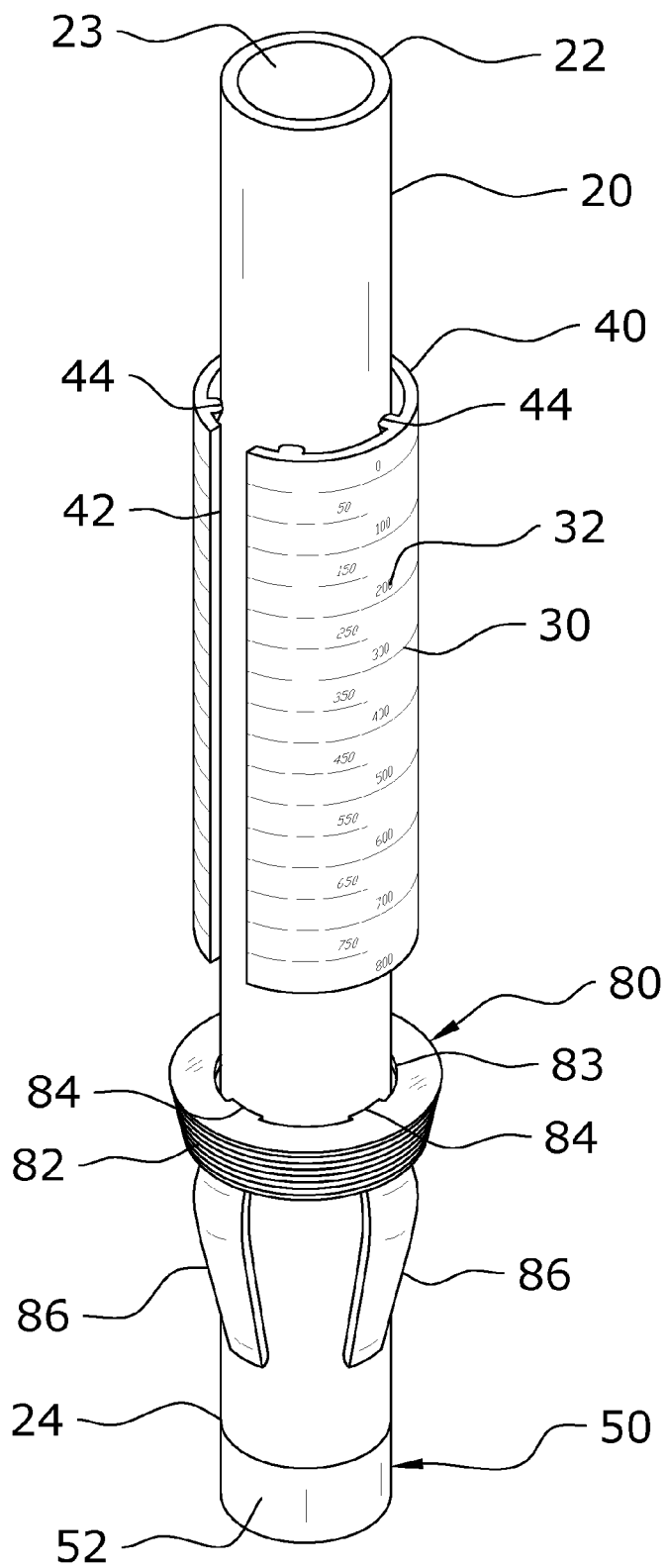
FIG. 18 is an upper perspective view of another embodiment of the present invention.
Figure 19:
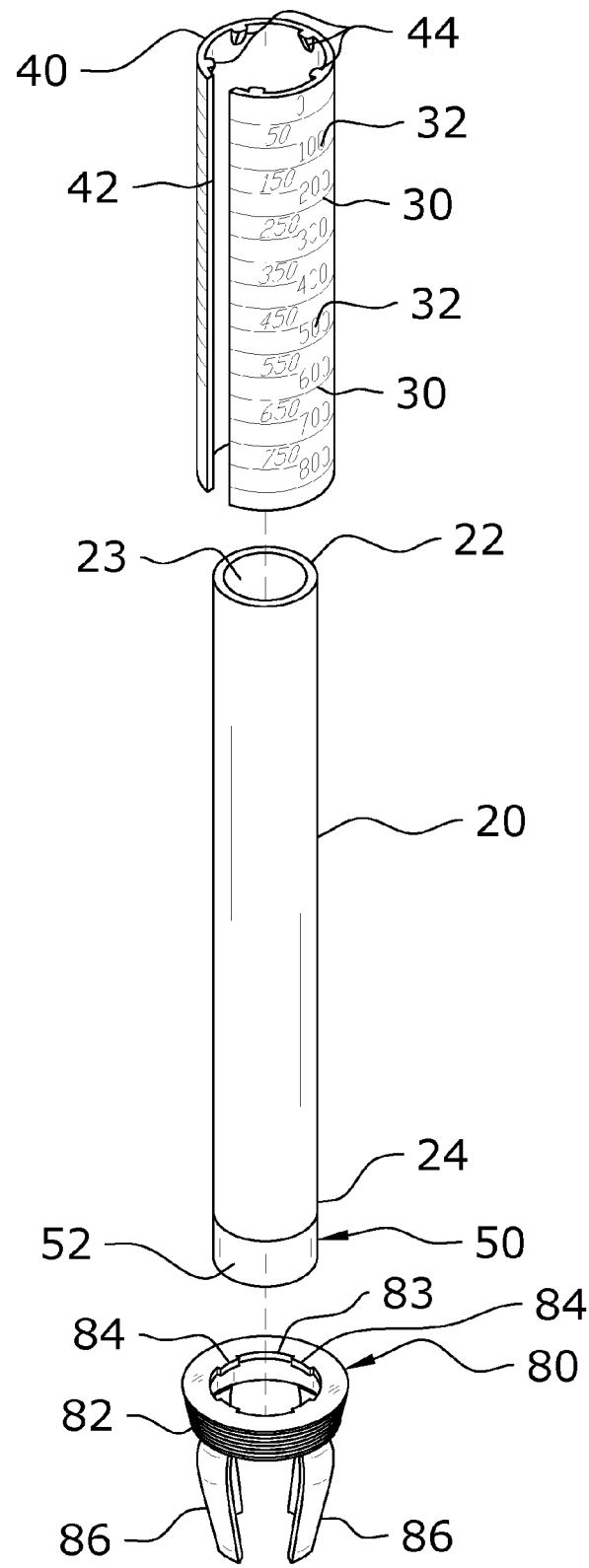
FIG. 19 is an exploded upper perspective view of the embodiment shown in FIG. 18.
Figure 20:
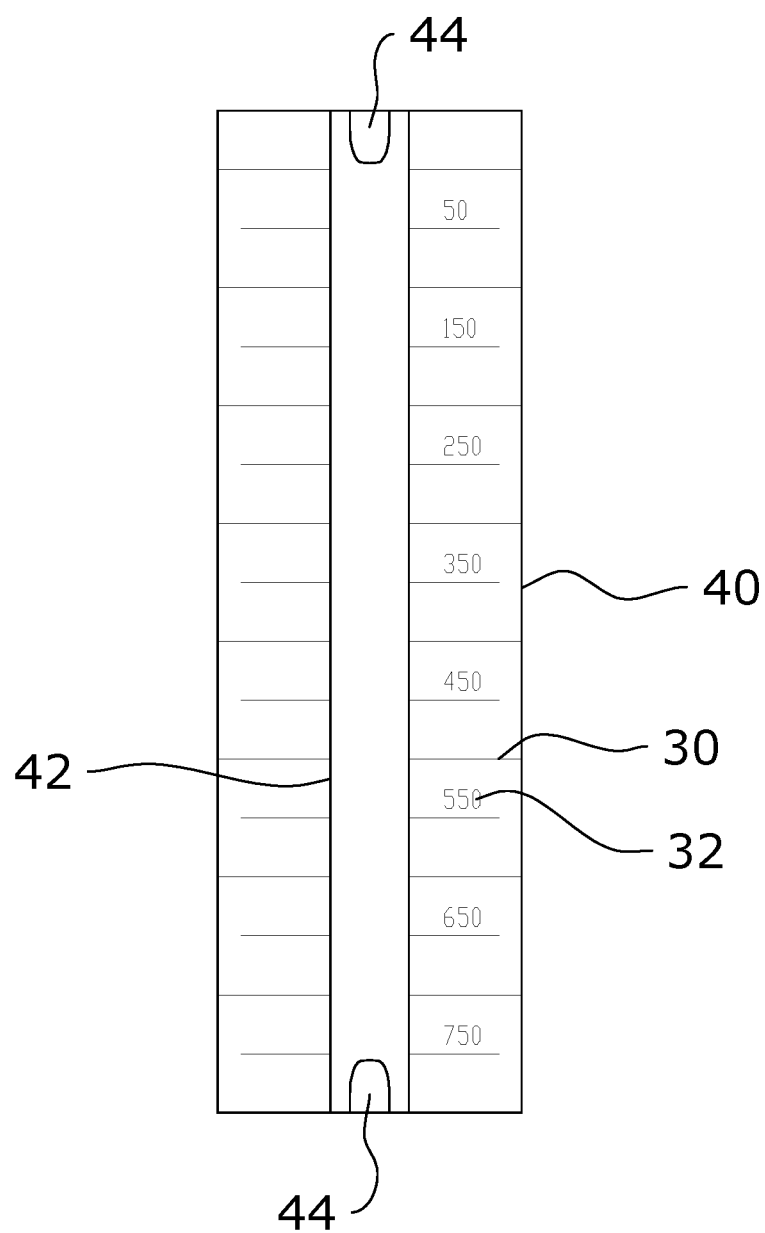
FIG. 20 is a side view of an embodiment of the marker.
Figure 21:
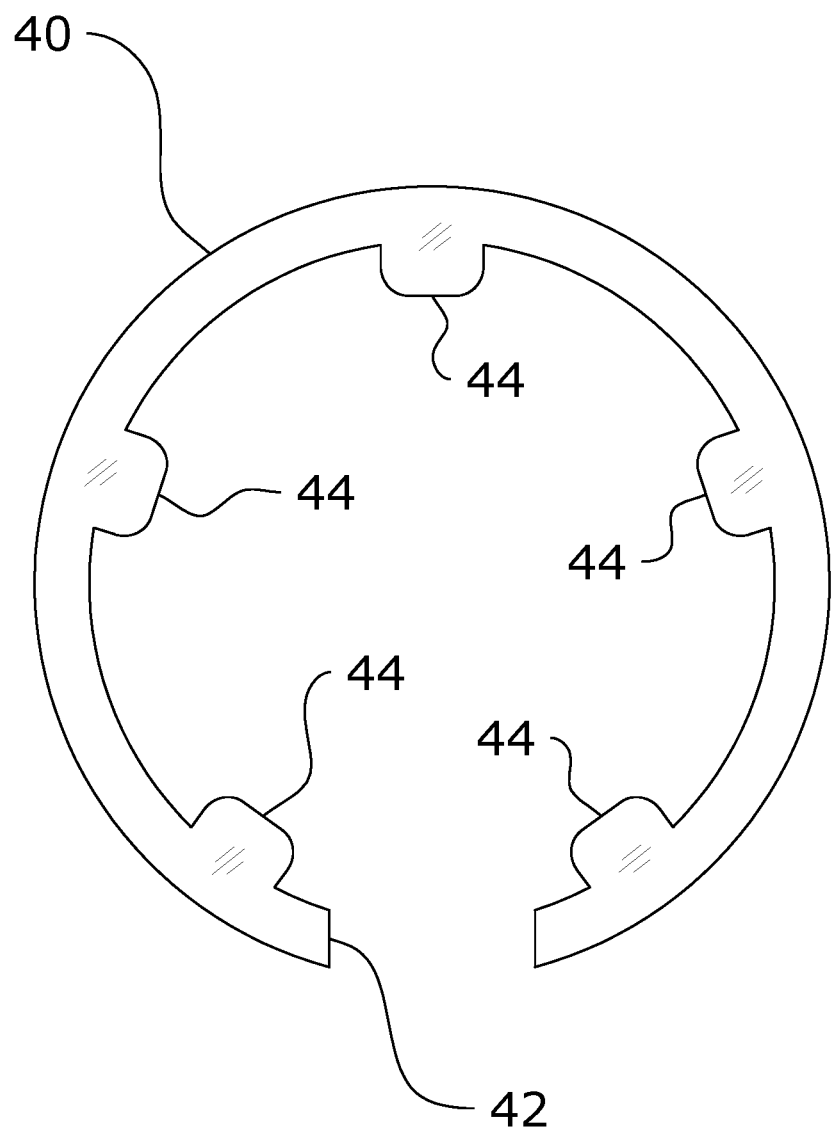
FIG. 21 is a top view of an embodiment of the marker.
Figure 22:
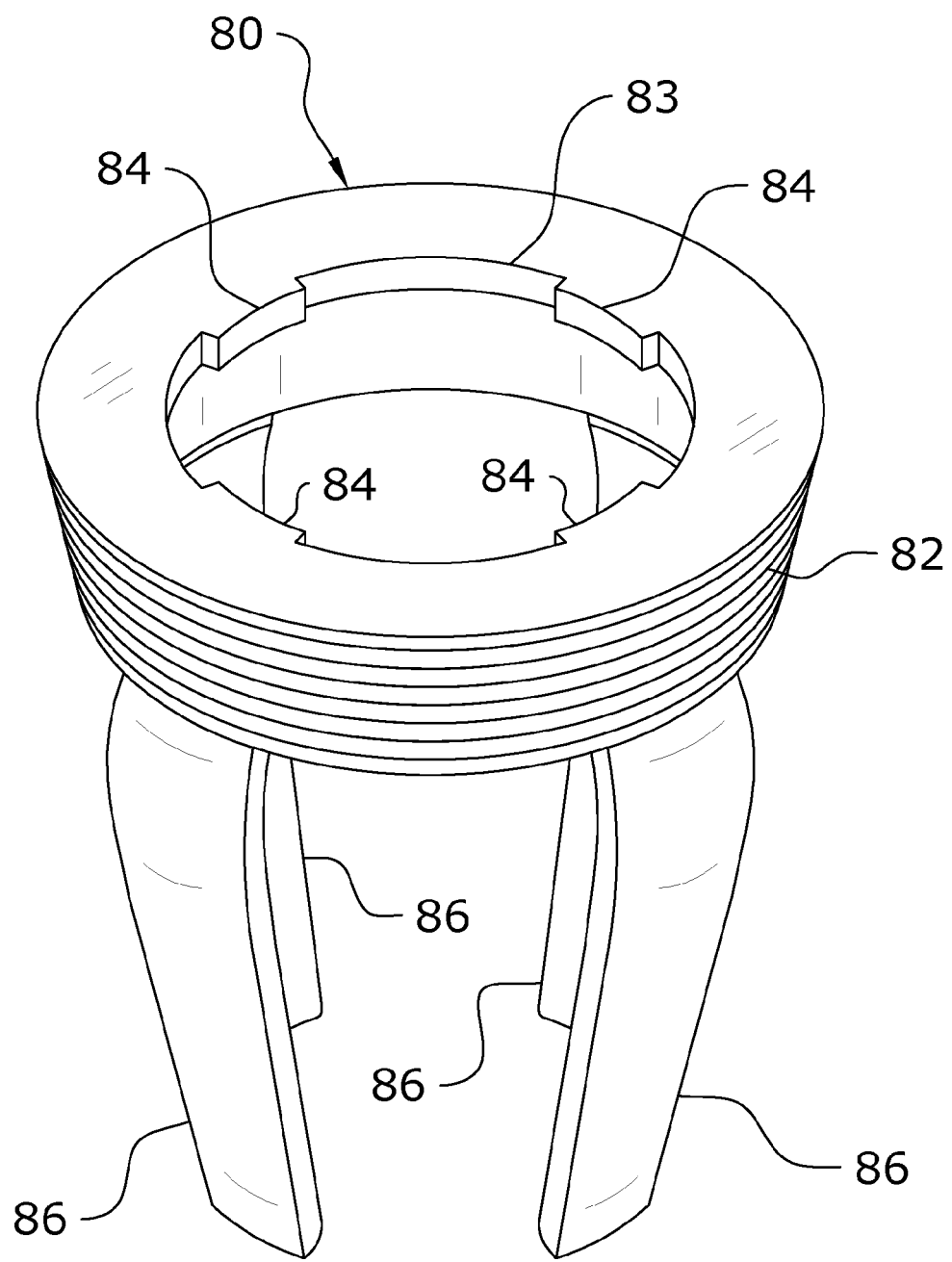
FIG. 22 is an upper perspective view of an embodiment of a support member to support the graduated cylinder within a chemical container.
Figure 23:
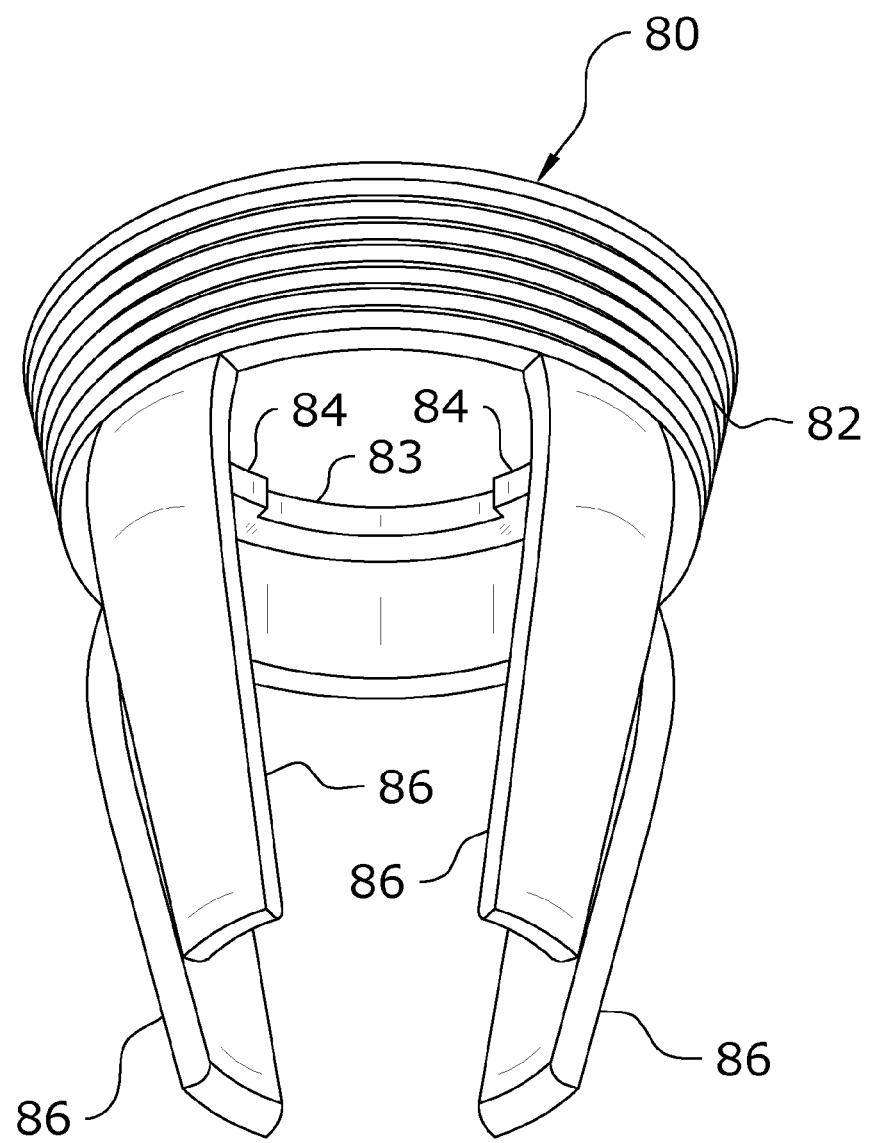
FIG. 23 is a lower perspective of an embodiment of the support member.
Figure 24:
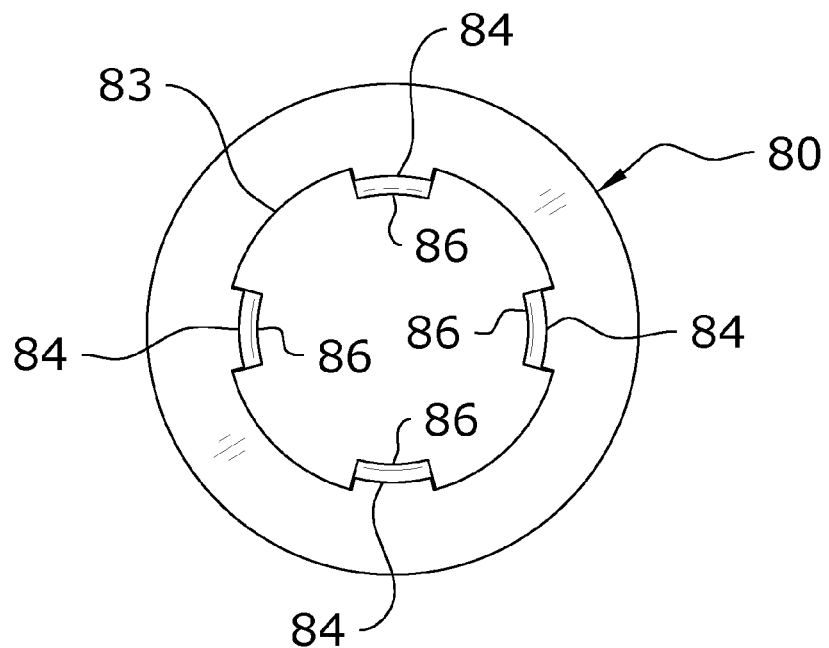
FIG. 24 is a top view of an embodiment of the support member.
Figure 25:
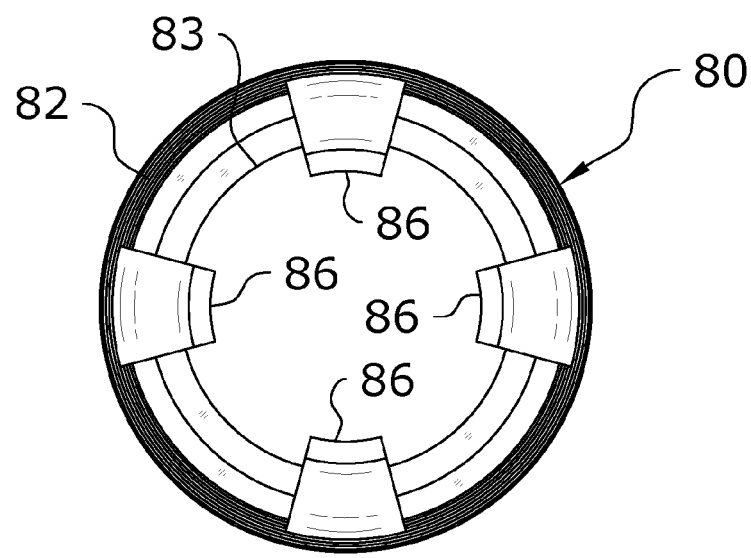
FIG. 25 is a bottom view of an embodiment of the support member.
Figure 26:
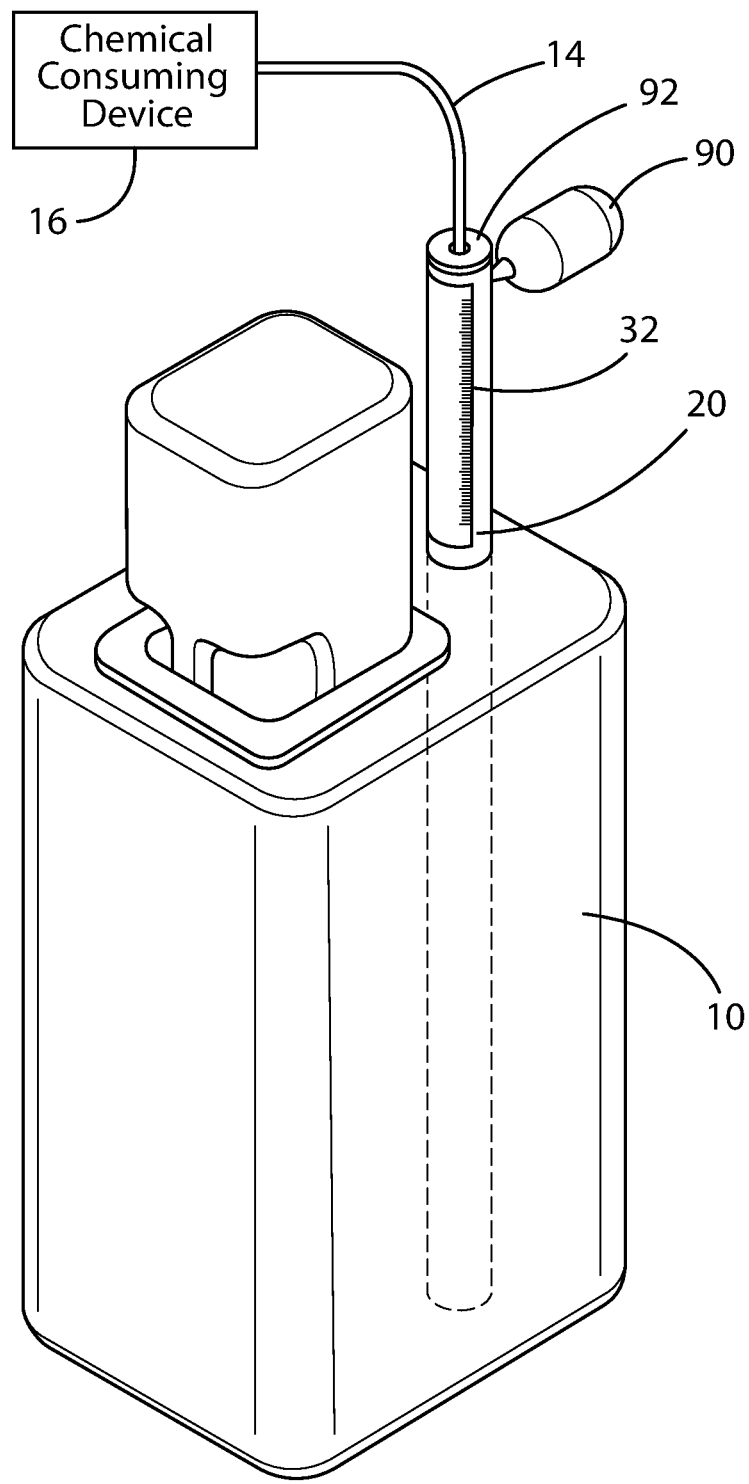
FIG. 26 is a front upper perspective view of an embodiment with a vacuum device.
Figure 27:
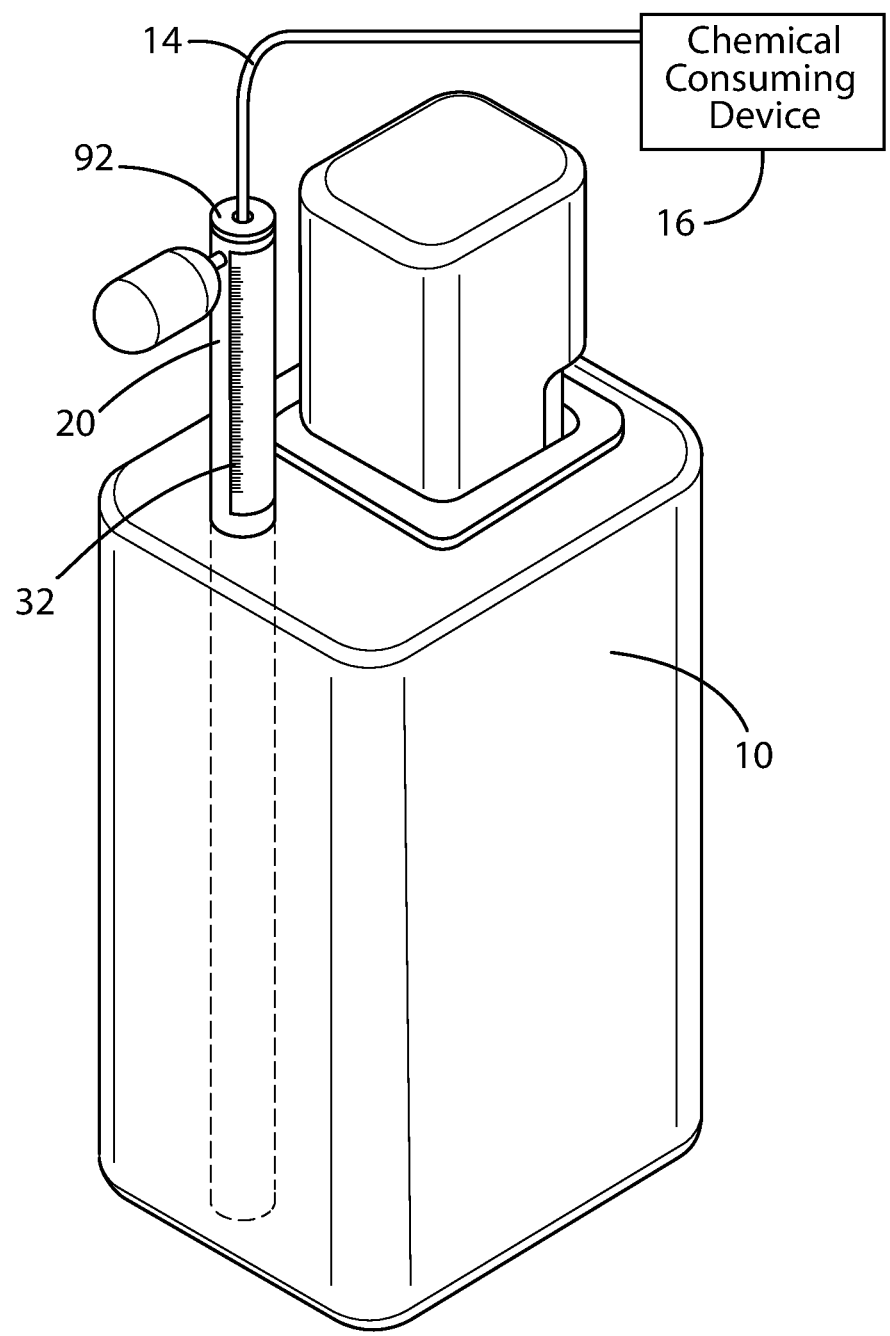
FIG. 27 is a rear upper perspective view of the embodiment with the vacuum device.
Figure 28:
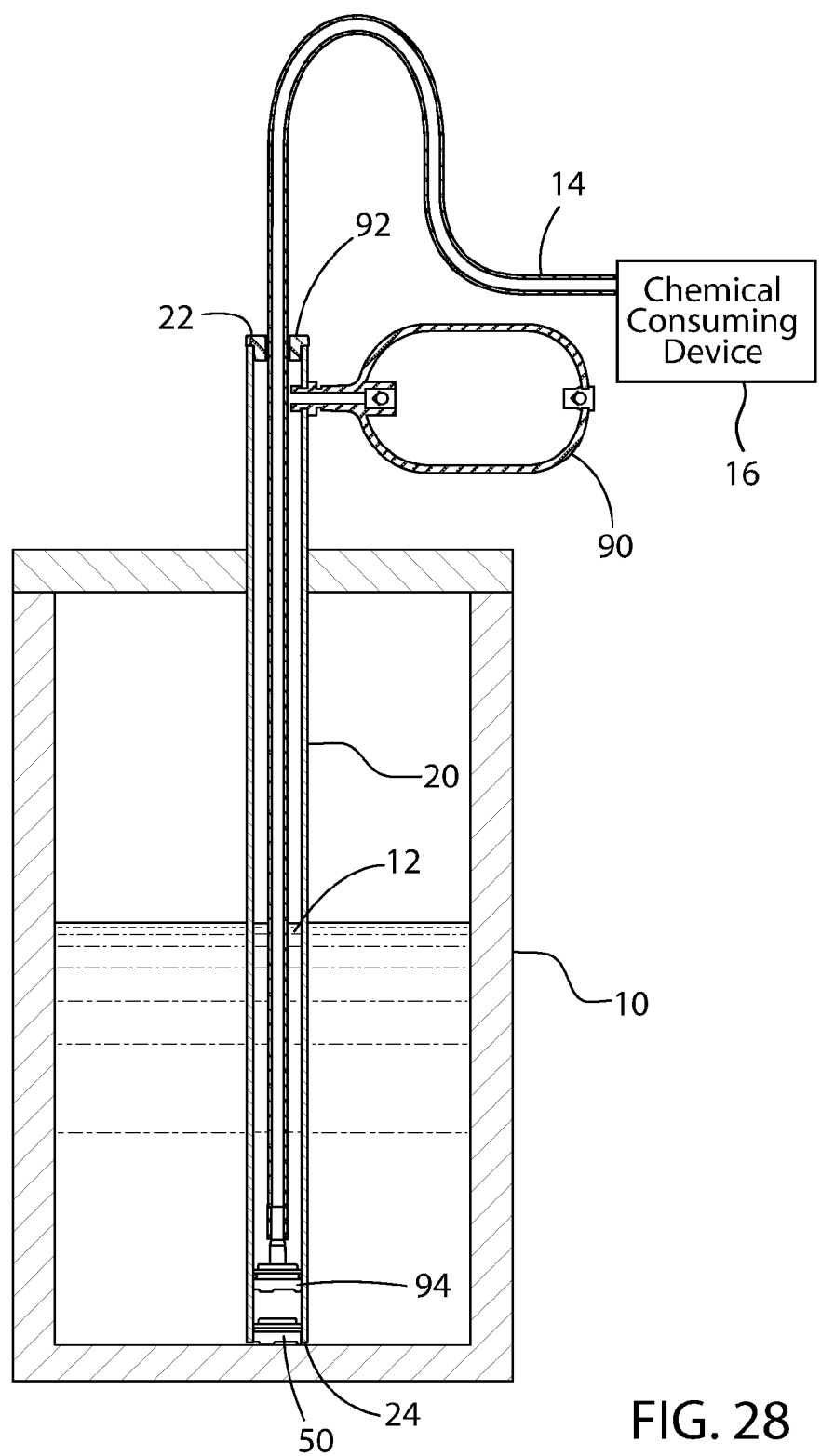
FIG. 28 is a side cross sectional view of the embodiment with the vacuum device.

FIGS. 18 through 21 illustrate an alternative marker 40 that has an elongated tubular structure that preferably extends along at least half of the length of the graduated cylinder 20 (however, shorter lengths may be used). The marker 40 is comprised of an elongated structure that is preferably concentrically positioned upon the graduated cylinder 20. The marker 40 includes a cutout 42 extending from a top end to a lower end of the marker 40 as shown in FIGS. 18 through 20. The marker 40 further preferably includes a plurality of ribs 44 that extend longitudinally along an interior portion of the marker 40. The ribs 44 preferably extend along the entire length of the marker 40, however, the ribs 44 may extend along only a portion of the marker 40. The plurality of ribs are adapted to slidably engage the graduated cylinder as illustrated in FIG. 18.

The marker 40 preferably includes a plurality of line markings 30 that are horizontally orientated to correspond to a volume of liquid chemical 12 in the graduated cylinder 20 at a certain location. The marker 40 20 further preferably includes a plurality of measurement indicia 32 corresponding to the plurality of line markings 30 as shown in FIG. 18 of the drawings.

In use, the user moves the marker 40 so that the zero line marking 30 is aligned with the initial upper level of the liquid chemical 12 in the graduated cylinder. After the chemical inlet line 14 is inserted and the vehicle wash is operated to us a volume of the liquid chemical 12 in the graduated cylinder, the user is able to calculate the volume of liquid chemical 12 used by the vehicle wash for the period of time by identifying the final upper level of the liquid chemical 12 in the graduated cylinder 20 as indicated by the corresponding line marking 30 and measurement indicia 32 on the marker 40.

F. Support Stand.

A support stand 70 is preferably used with the graduated cylinder 20 to removably receive and support the graduated cylinder 20 after removed from the chemical container 10. The support stand 70 has a base portion 72 and a vertical portion 75 extending upwardly from the base portion 72. The vertical portion 75 is comprised of a tubular structure having an opening slightly larger than the lower end 24 of the graduated cylinder 20. The vertical portion 75 of the support stand 70 is adapted to removably receive the lower end 24 of the graduated cylinder 20. Alternatively, the support stand 70 may be non-removably attached to the graduated cylinder 20 by making the support strand permeable to allow for the liquid chemical 12 to enter the lower end 24 or lower portion of the graduated cylinder 20.

G. Cleaning Device.

Figure 11:
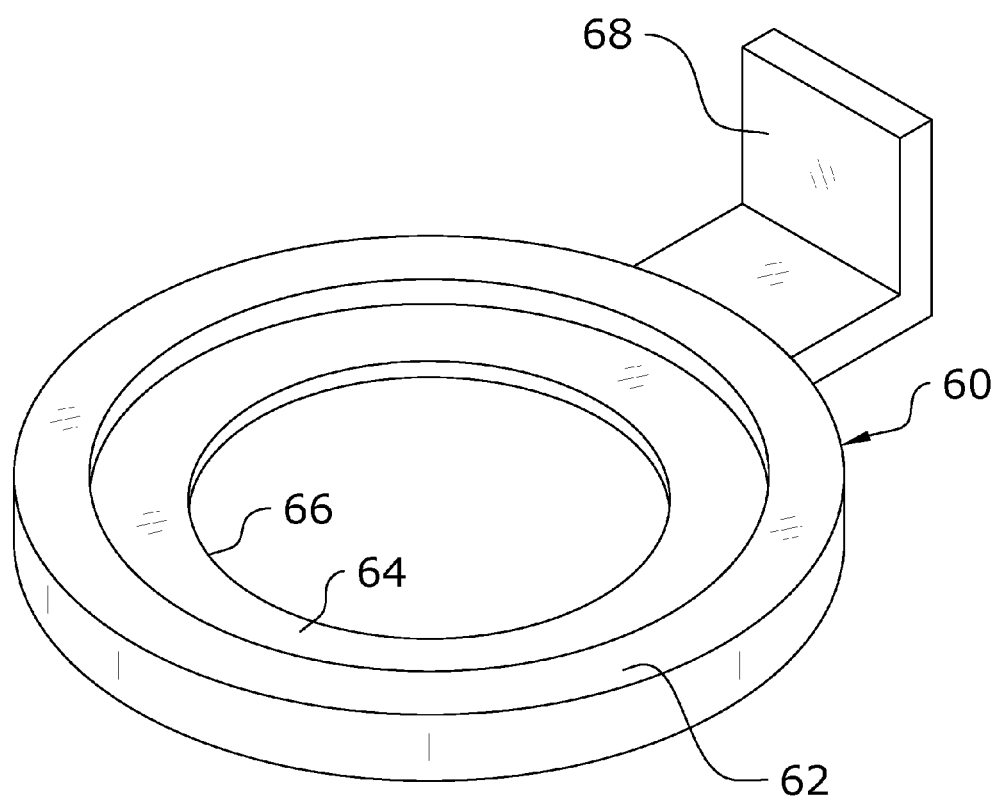
FIG. 11 is an upper perspective view of a cleaning device attachable to the chemical container to clean the exterior of the graduated cylinder of the liquid chemical upon removal thereof from the chemical container.
Figure 12:
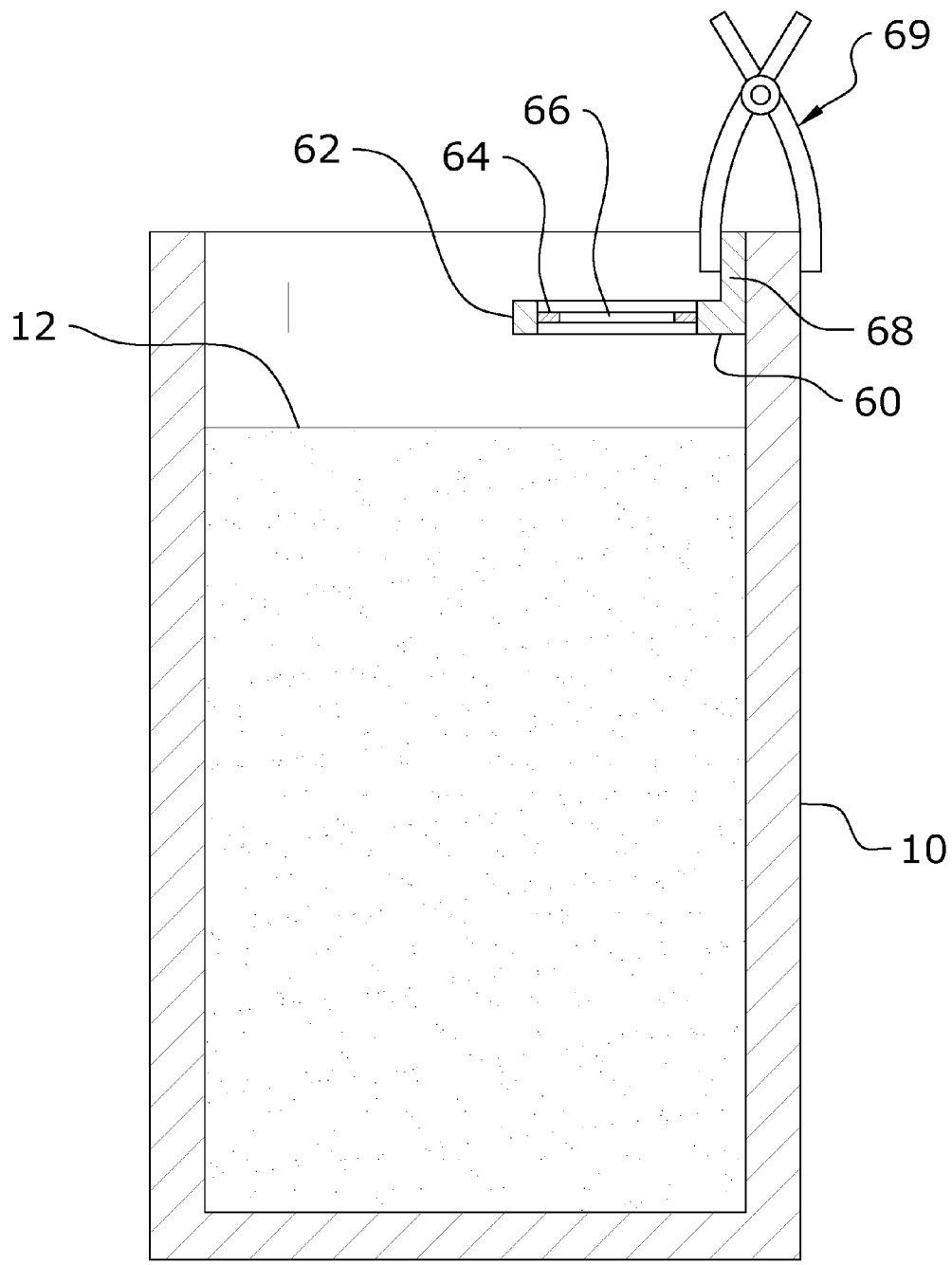
FIG. 12 is a front cross sectional view showing the cleaning device attached to the chemical container with a clip device.
Figure 13:
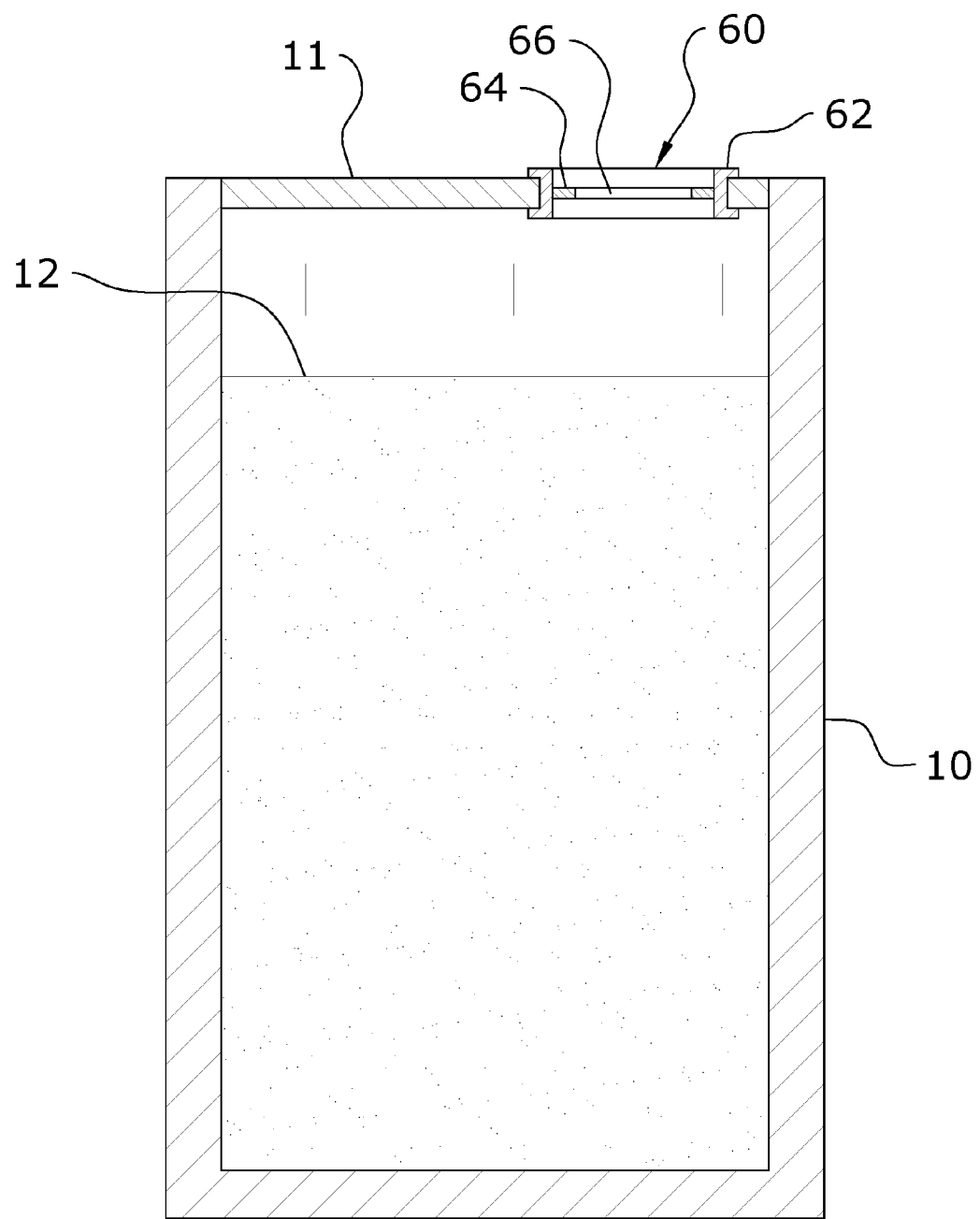
FIG. 13 is a front cross sectional view showing the cleaning device integrated into the ceiling of the chemical container.
Figure 14:
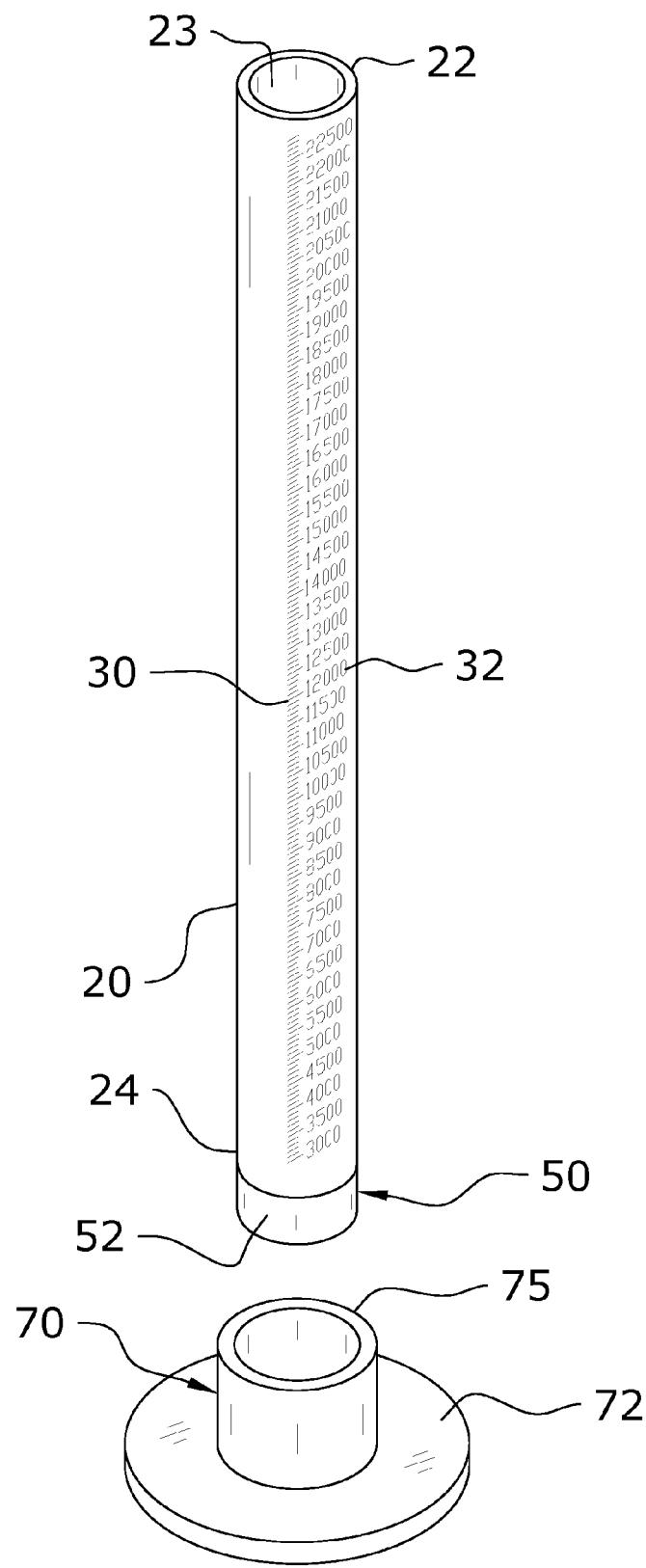
FIG. 14 is an exploded upper perspective view of the graduated cylinder above a support stand to support the graduated cylinder in a vertical manner after removal from the chemical container.
Figure 15:
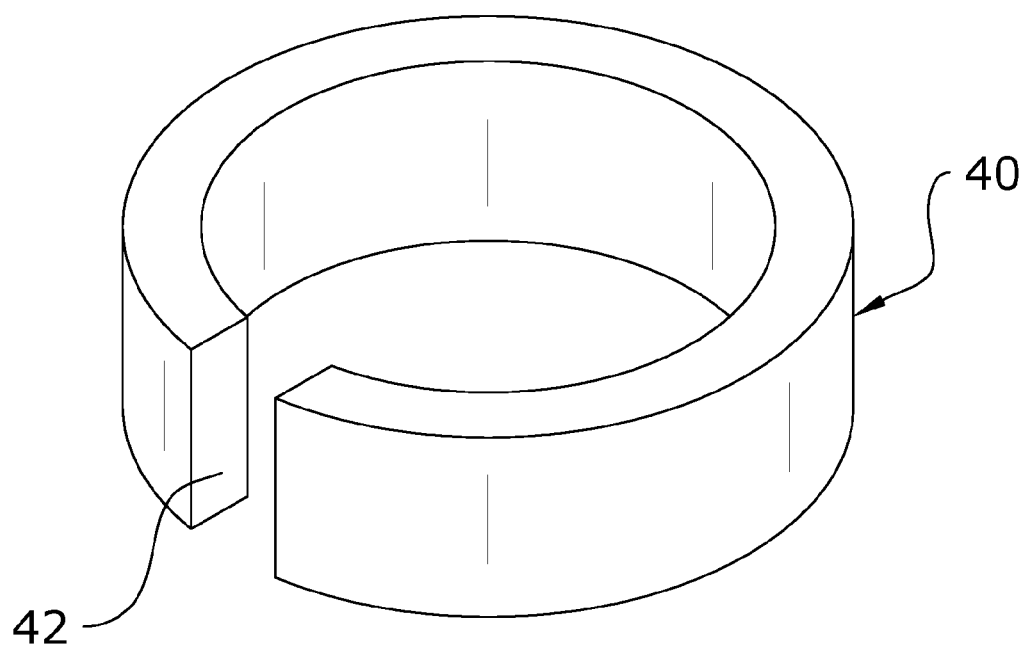
FIG. 15 is an upper perspective view of another embodiment of the marker.
Figure 16:
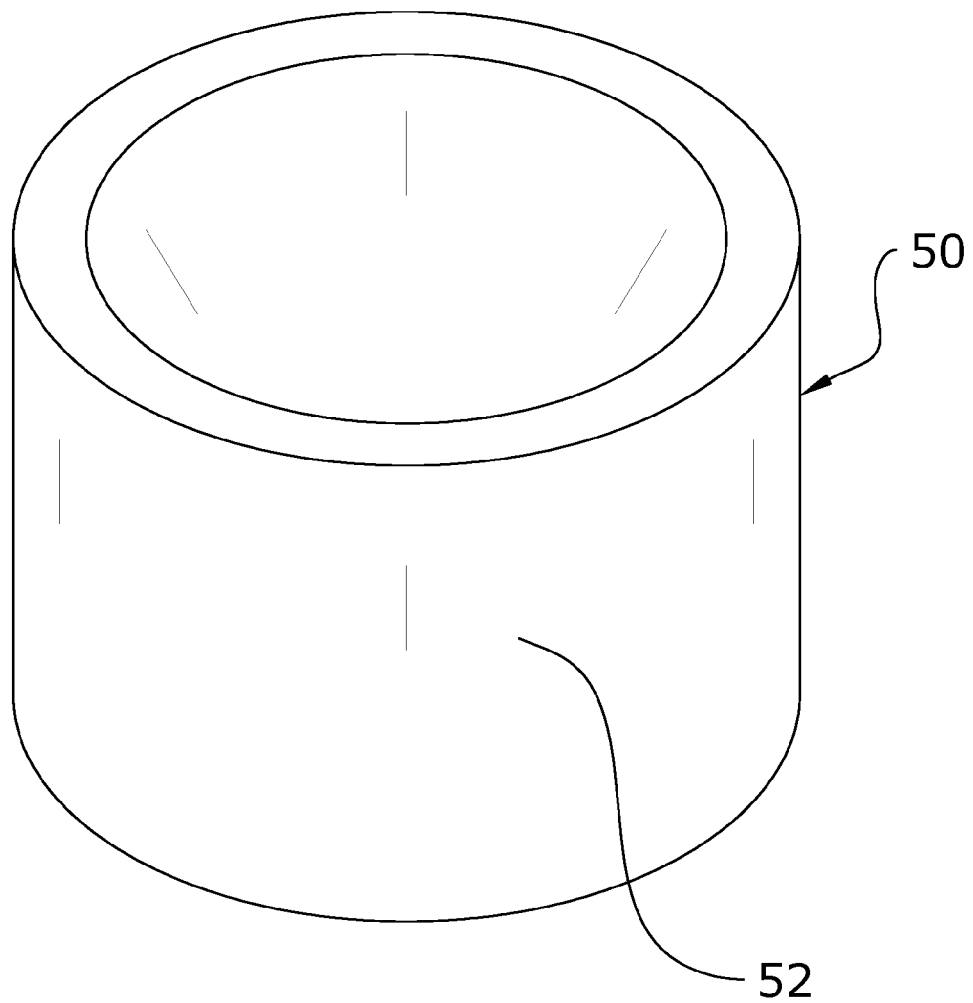
FIG. 16 is an upper perspective view of the valve unit for ball check valve.

FIGS. 11 through 13 illustrate an exemplary cleaning device 60 having a support member 62 and a cleaning grommet 64 defining a cleaning opening 66. The cleaning grommet 64 is comprised of a rubber grommet having the cleaning opening 66 that is adapted to slidably receive an exterior surface of the graduated cylinder 20 to remove residual liquid chemical 12 accumulated on the exterior surface of the graduated cylinder 20. The cleaning device 60 may include a bracket 68 extending from the support member 62 that is attached to the upper portion of the chemical container 10 with a clip device 69 or similar securing device as shown in FIGS. 11 and 12 of the drawings. Alternatively, the cleaning device 60 may be integrally formed within the ceiling 11 of the chemical container 10 as illustrated in FIG. 13 of the drawings. The user inserts the lower end 24 of the graduated cylinder 20 through the cleaning opening 66 of the cleaning device 60 into the chemical container 10 and then when the user removes the graduated cylinder 20 the residual liquid chemical 12 that accumulates on the outside of the graduated cylinder 20 is wiped off by the cleaning grommet 64 to reduce the messiness of using the various embodiments of the present invention. The exterior surface of the graduated cylinder 20 should be smooth to allow for relatively free movement through the cleaning grommet 64.

H. Support Member.

In another embodiment of the present invention, a support member 80 is provided that is adapted to fit within the opening of a ceiling 11 of a chemical container 10 of the vehicle wash. The support member 80 includes a body that has a generally ring shaped configuration in one embodiment and an opening 83 extending within the body from the upper end to the lower end of the body. The support member 80 may be constructed of various types of materials including rubber, plastic or metal. The opening 83 within the body of the support member 80 is adapted to slidably receive the graduated cylinder 20 to allow for the selective insertion of a portion of the graduated cylinder 20 into the chemical container 10. A plurality of extended portions 84 preferably extending inwardly a slight distance from the perimeter of a circular opening 83 to slidably engage the outer surface of the graduated cylinder 20.

A portion of the body of the support member 80 preferably includes threading 82 adapted to be threadably connected to a threaded opening within the ceiling 11 of a chemical container 80. The threading 82 is preferably external threading. Alternatively, a plurality of ring ribs may extend outwardly from the body of the support member 80 to frictionally engage the opening within the chemical container 10. Alternatively, no threading or ring ribs may be used. It is preferable that a portion of the body of the support member 80 is tapered inwardly from the top to the bottom.

The support member 80 preferably includes a plurality of prongs 86 that extend from the body of the support member 80. The plurality of prongs 86 are adapted to frictionally engage the graduated cylinder 20 to ensure proper vertical alignment and prevent accidental movement of the graduated cylinder 20 when positioned within the chemical container 10. There are preferably at least two prongs 86 extending downwardly from the bottom end of the support member 80 such that the prongs 86 are positioned within the interior of the chemical container 10 when the support member 80 is positioned within the opening of the chemical container 10. The prongs 86 are further comprised of a resilient material (e.g. metal, spring metal, plastic) that allow for passage of the graduated cylinder 20 through the prongs 86 in a slidable manner. The prongs 86 each preferably taper and extend inwardly. The user first preferably connects the support member 80 within the opening of the chemical container 10 and then is able to insert (and remove) the graduated cylinder 20 through the opening 83 to acquire chemical within the chemical container 10.

I. Operation of Preferred Embodiment.

FIGS. 8a through 9b illustrate the general usage of the invention to measure the volume of liquid chemical 12 used during one or more cycles (or period of time). The user first positions the lower end 24 of the graduated cylinder 20 above a chemical container 10 and then extends downwardly the lower end 24 of the graduated cylinder 20 into the chemical container 10 below an upper surface of the liquid chemical 12 in the chemical container 10 as illustrated in FIGS. 8a and 8b of the drawings. If the cleaning device 60 is attached to the chemical container 10, the user would extend the graduated cylinder 20 downwardly through the cleaning opening 66 within the cleaning grommet 64. The user allows the liquid chemical 12 to enter the interior of the graduated cylinder 20 through the check valve 56 based on the fluid pressure in the chemical container 10 as illustrated in FIG. 8c of the drawings. After a minimum volume of liquid chemical 12 enters the graduated cylinder 20 (or the level of liquid chemical 12 in the graduated cylinder 20 is equal to the level of liquid chemical 12 in the chemical container 10) as shown in FIG. 8d of the drawings, the user then removes the graduated cylinder 20 from the chemical container 10 as shown in FIG. 8e of the drawings. If using the cleaning device 60, the upward movement of the graduated cylinder 20 through the cleaning grommet 64 removes the residual liquid chemical 12 so the residual liquid chemical 12 can remain within the chemical container 10. The graduated cylinder 20 is then positioned within the support strand to support the graduated cylinder 20 in a vertical manner and the support stand 70 is positioned upon a flat surface such as a table. The user then adjusts a marker 40 upon the exterior of the graduated cylinder 20 to a location adjacent to an initial chemical level in the graduated cylinder 20 as shown in FIG. 9a of the drawings. The user also inserts the chemical inlet line 14 (normally connected to the chemical container 10) through the upper opening 23 of the graduated cylinder 20 as shown in FIG. 9a of the drawings. The chemical inlet line 14 is fluidly connected to a chemical consuming device 16 (e.g. vehicle wash). The user then operates the chemical consuming device 16 one or more cycles (or for a period of time) wherein the chemical consuming device 16 draws at least a portion of the liquid chemical 12 in the graduated cylinder 20 out of the graduated cylinder 20 for consumption by the chemical consuming device 16. After operating the chemical consuming device 16 one or more cycles (or a period of time), the user then identifies the final chemical level in the graduated cylinder 20 as shown in FIG. 9b of the drawings. The user also returns the chemical inlet line 14 to be fluidly connected to the chemical container 10. Based on the difference between initial chemical level (FIG. 9a) and the final chemical level (FIG. 9b), the user is then able to calculate a total volume of liquid chemical 12 consumed during the one or more cycles (or period of time). If more than one cycle of the chemical consumer device were ran (e.g. two or more vehicles were washed in a vehicle wash), the user divides the total volume of liquid chemical 12 consumed by the total number of cycles to calculate a cycle volume of liquid chemical 12 consumed by the chemical consuming device 16. Alternatively, if a period of time was used the user may divide the total volume of liquid chemical 12 consumed by the time period to establish a flowrate (e.g. 5 ml per minute). After the calculations are performed (or at least the final chemical level measurement taken), the user then dispenses any remaining liquid chemical 12 from within the graduated cylinder 20 through the upper opening 23 of the graduated cylinder 20 back into to the chemical container 10. The user then returns the graduated cylinder 20 back to the support stand 70 for later usage or repeats the above process with a different chemical container 10.

J. Vacuum Device Embodiment.

FIGS. 26 through 31 illustrate a vacuum device 90 fluidly connected to the graduated cylinder 20. The vacuum device 90 is preferably fluidly connected to an upper portion of the graduated cylinder 20 and further preferably fluidly connected to near the upper end 22 of the graduated cylinder 20 as illustrated in FIGS. 26 through 31 of the drawings. The vacuum device 90 may be fluidly connected to the graduated cylinder 20 at various other locations that are above the liquid chemical 12 in the graduated cylinder 20 when the graduated cylinder 20 is filled with the liquid chemical 12. The vacuum device 20 may be directly connected to the graduated cylinder 20 or connected fluidly through a tube.

The vacuum device 90 may be comprised of various devices that are capable of creating at least a partial vacuum. For example, the vacuum device 90 may be comprised of a manual vacuum device (e.g. vacuum bulb) or a motorized vacuum device (e.g. electric powered vacuum pumps). In addition, various types of vacuum pumps, such as positive displacement pumps, may be utilized for the vacuum device.

Figure 29:
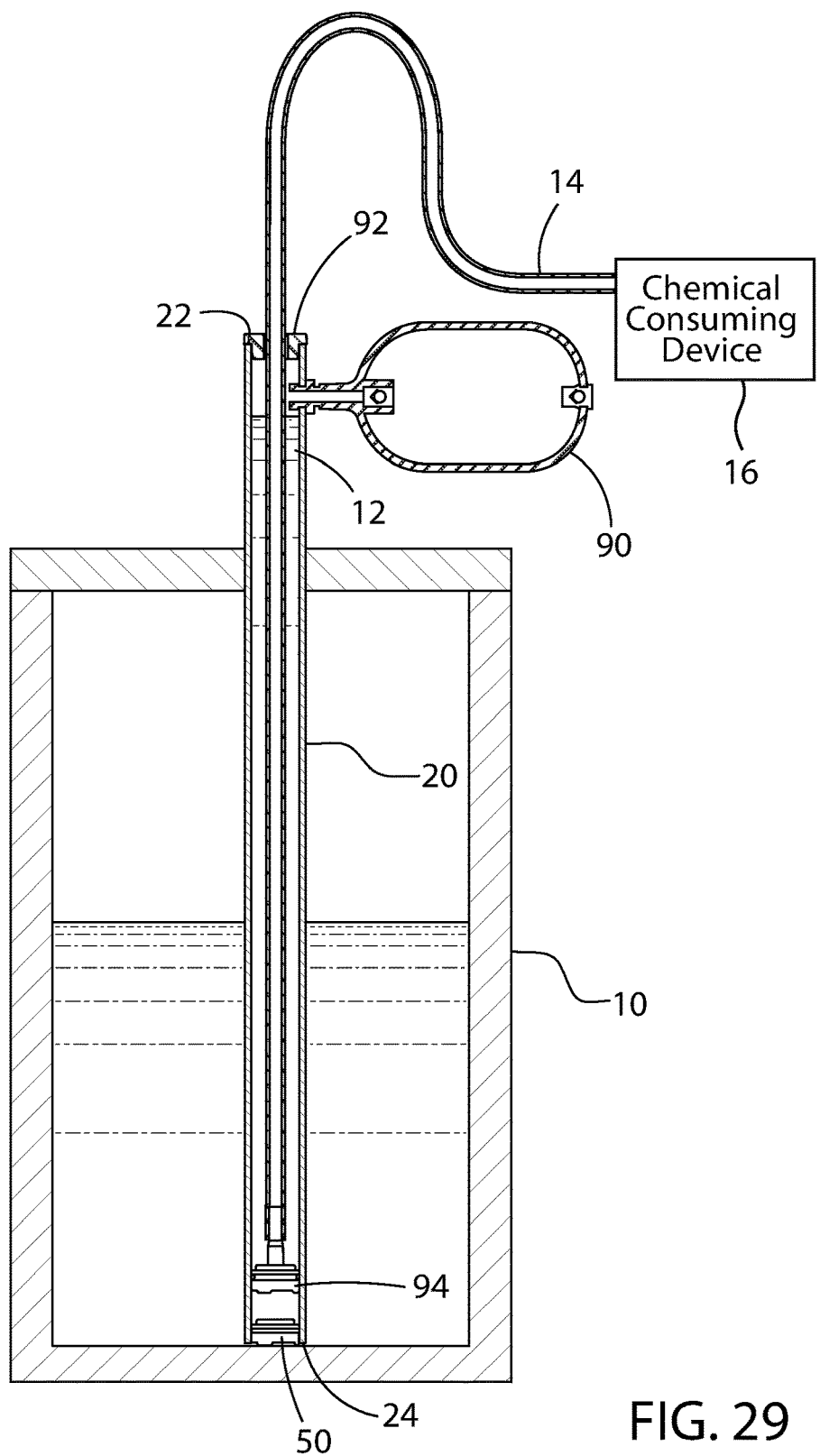
FIG. 29 is a side cross sectional view of the embodiment with the vacuum device and the chemical level within the graduated cylinder elevated to an upper level.
Figure 30:
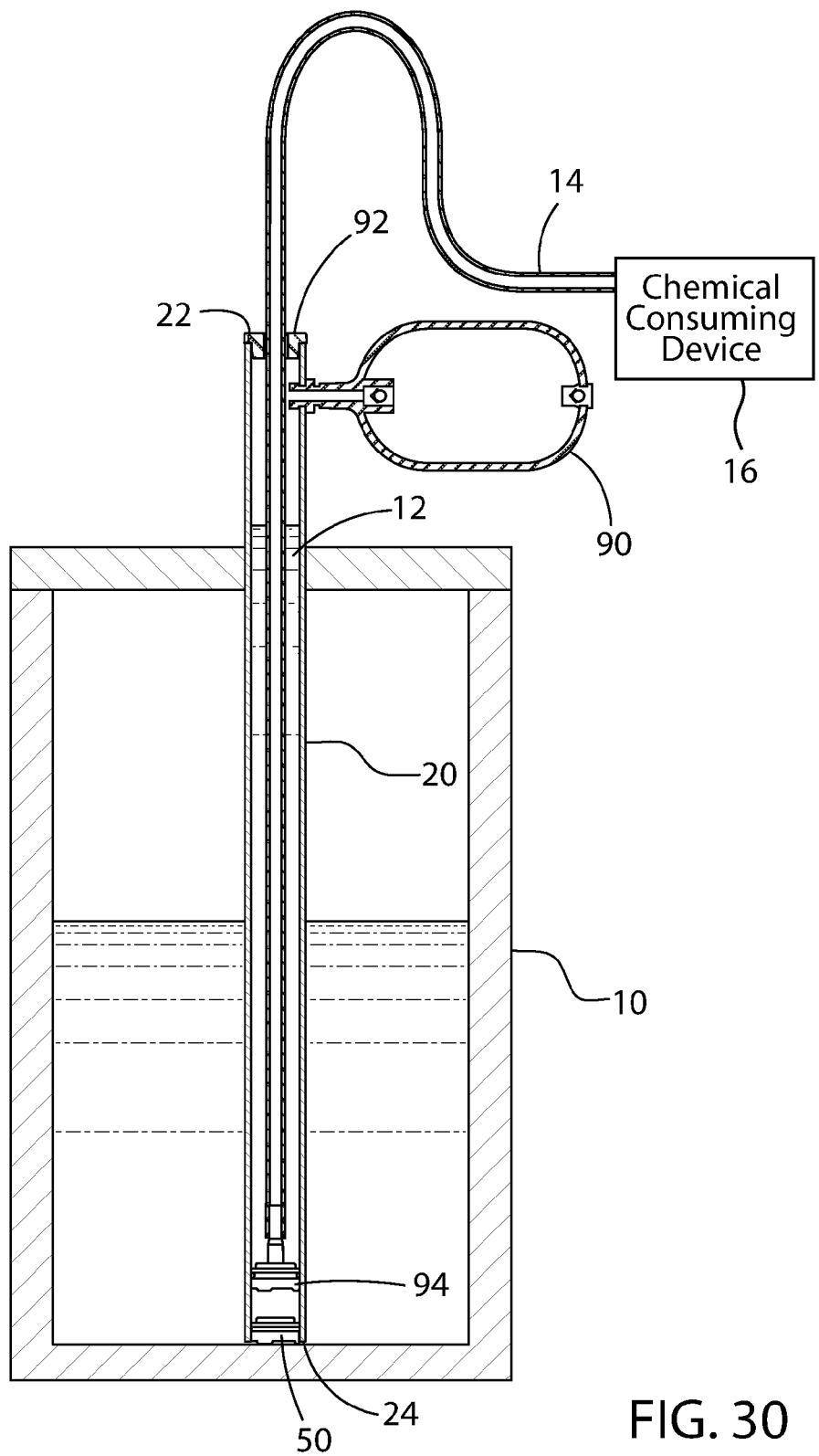
FIG. 30 is a side cross sectional view of the embodiment with the vacuum device and the chemical level within the graduated cylinder lowered due to consumption of the liquid chemical by the chemical consuming device over a period of time.
Figure 31:
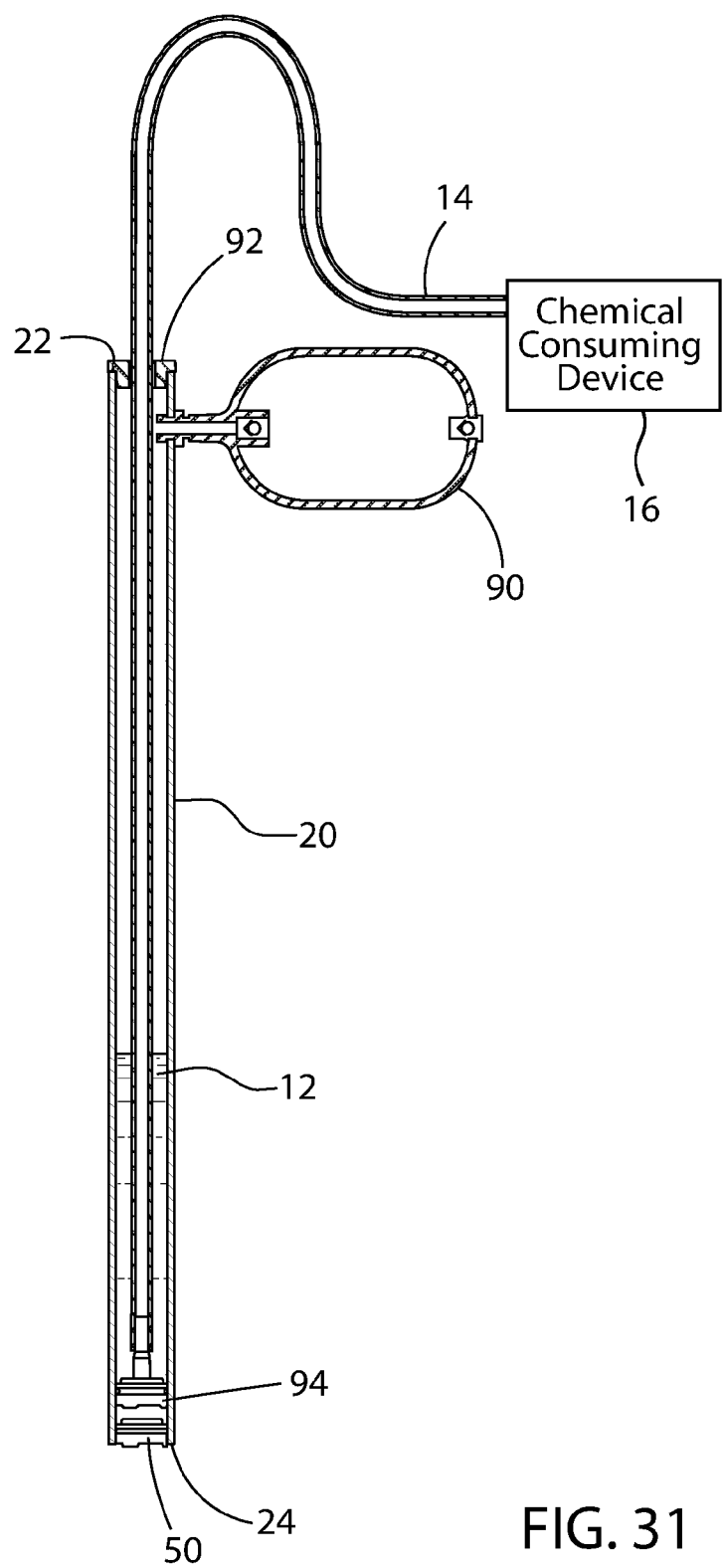
FIG. 31 is a side cross sectional view of the embodiment with the vacuum device.

An example of a manual vacuum device 90 suitable for usage herein is a rubber vacuum pump also referred to as a vacuum bulb as shown in FIGS. 26 through 31 of the drawings. A vacuum bulb has two check valves at the opposing ends where a first check valve allows gas to pass into the interior of the vacuum bulb when the vacuum bulb is allowed to expand but not outside of the vacuum bulb when the vacuum bulb is manually squeezed by the user. The second check valve in the vacuum bulb allows gas to pass outside of the vacuum bulb when the vacuum bulb manually squeeze but not inside of the vacuum bulb when the vacuum bulb is allowed to expand. The end of the vacuum bulb with the first check valve is fluidly connected to the graduated cylinder 20 to create at least a partial vacuum within the graduated cylinder 20 which draws the liquid chemical 12 upwardly into the graduated cylinder above the level of liquid chemical in the chemical container 10 as shown in FIG. 29.

As further shown in FIGS. 28 through 31 of the drawings, the chemical inlet line 14 extends through a seal 92 within the upper portion of the graduated cylinder 20. The chemical inlet line 14 extends downwardly to a lower portion of the graduated cylinder 20. The lower end of the chemical inlet line 14 preferably includes a check valve 94 that allows liquid chemical within the graduated cylinder 20 to enter the chemical inlet line 14 as drawn by the chemical consuming device 16 during testing of the amount of chemical used by the chemical consuming device 16. A check valve 94 is not required for the chemical inlet line 14 and the chemical inlet line 14 may just have an open end.

As shown in FIGS. 26 through 30 of the drawings, the graduated cylinder 20 is preferably attached to the chemical container 10 is a stationary manner with the lower end 24 of the graduated cylinder 20 extending into the interior of the chemical container 10 near the floor of the chemical container 10 to allow for the entry of the liquid chemical 12 from the chemical container 10. The graduated cylinder 20 is preferably transparent or semi-transparent with one or more measuring labels with measurement indicia 32 (e.g. lines, volume numbering, etc.) attached to the portion of the graduated cylinder 20 exposed from the chemical container 10. The graduated cylinder 20 may extend through the ceiling of the chemical container 10 as illustrated in FIGS. 26 through 30 or various other portions of the chemical container (e.g. sidewall). A portion of the graduated cylinder 20 extends outwardly from the chemical container 10 to provide for viewing of the liquid chemical level in the graduated cylinder 20.

In use, the user operates the vacuum device 90 to draw gas from the interior of the graduated cylinder 20 thereby reducing the pressure in the interior of the graduated cylinder 20. When the pressure within the interior of the graduated cylinder 20 is reduced, the liquid chemical 12 is drawn upwardly within the graduated cylinder 20 until the height of the liquid chemical 12 corresponds to the pressure within the graduated cylinder 20 compared to external atmospheric pressure. The vacuum device 90 does not have a perfect seal with respect to the atmosphere thereby allowing the interior pressure of the graduated cylinder 20 to increase but the check valve at the lower end of the graduated cylinder 20 prevents the liquid chemical 12 from emptying back into the chemical container 20 regardless of the height of the liquid chemical 12 inside of the graduated cylinder 20. The lower the pressure in the graduated cylinder 20 compared to atmospheric pressure, the higher the level of the liquid chemical 12 will be in the graduated cylinder. After the user draws the liquid chemical 12 up to a desired start level as shown in FIG. 29, the user then stops operating the vacuum device, records the start level using the measurement indicia 32 on the graduated cylinder, records the start time and then operates the chemical consuming device 16 fluidly connected to the chemical inlet line 14 which draws the liquid chemical 12 from the graduated cylinder over a measured period of time. After a period of time has passed (e.g. 2 hours), the user then measures the end level of the liquid chemical 12 within the graduated cylinder 20 and the end time to determine the total period of time the chemical was consumed by the chemical consuming device 16. The user is able to calculate the amount of liquid chemical 12 used over the period of time to provide an accurate measurement of the chemical consumption rate of the chemical consuming device 16. Furthermore, the user doesn't have to open or close any valves since they can allow the chemical consuming device 16 to continue operating drawing liquid chemical from the graduated cylinder 20 since the chemical level within the graduated cylinder 20 will always be approximately the same as the chemical level in the chemical container 10.

K. Pump Device Embodiment.

Figure 32:
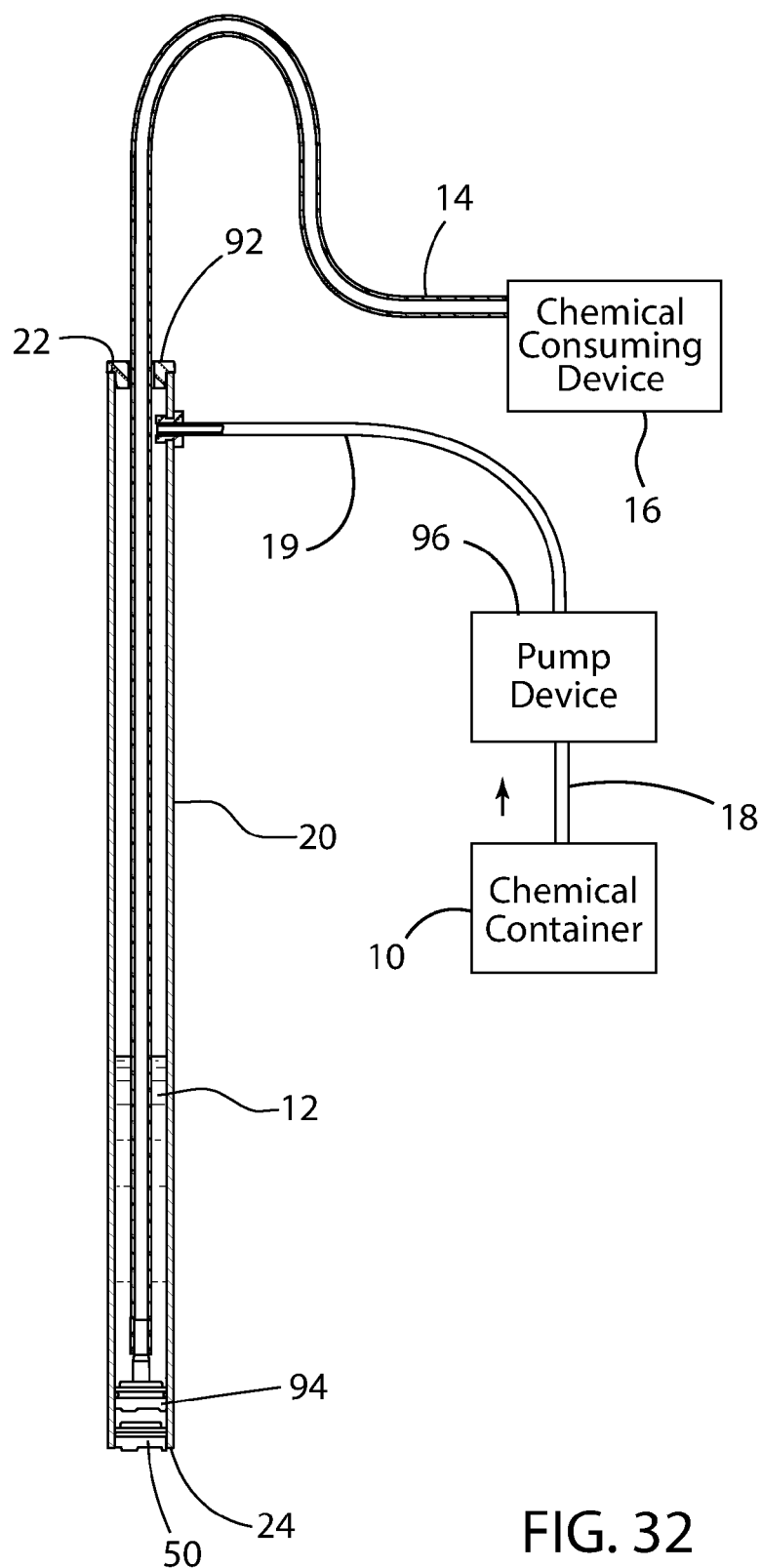
FIG. 32 is a side cross sectional view of an embodiment with a pump device.

In another alternative embodiment shown in FIG. 32, a pump device 96 is fluidly connected to the graduated cylinder 20 to fill the graduated cylinder 20 to a desired level of liquid chemical 12. The pump device 96 is used to draw liquid chemical from the chemical container 10 and dispense the liquid chemical into the graduated cylinder 20 to a desired level similar to the vacuum device embodiment discussed above. The pump device 96 may be a manual pump or an electrically powered pump capable of pumping the liquid chemical 12. With this embodiment, the graduated cylinder 20 may be positioned external of the chemical container 10 without any portion of the graduated cylinder 20 positioned within the chemical container 10.

In use, the pump device 96 draws liquid chemical 12 from the chemical container 10 through a first line 18 and then transfers the liquid chemical 12 to the interior of the graduated cylinder 20 through a second line 19. After the user pumps the liquid chemical 12 up to a desired start level, the user then stops operating the pump device, records the start level using the measurement indicia 32 on the graduated cylinder, records the start time and then operates the chemical consuming device 16 fluidly connected to the chemical inlet line 14 which draws the liquid chemical 12 from the graduated cylinder over a measured period of time. After a period of time has passed (e.g. 2 hours), the user then measures the end level of the liquid chemical 12 within the graduated cylinder 20 and the end time to determine the total period of time the chemical was consumed by the chemical consuming device 16. The user is able to calculate the amount of liquid chemical 12 used over the period of time to provide an accurate measurement of the chemical consumption rate of the chemical consuming device 16. Furthermore, the user doesn't have to open or close any valves since they can allow the chemical consuming device 16 to continue operating drawing liquid chemical from the graduated cylinder 20 since the chemical level within the graduated cylinder 20 will always be approximately the same as the chemical level in the chemical container 10.

Unless otherwise defined, all technical and scientific terms used herein have the same meaning as commonly understood by one of ordinary skill in the art to which this invention belongs. Although methods and materials similar to or equivalent to those described herein can be used in the practice or testing of the self-filling graduated cylinder system, suitable methods and materials are described above. All publications, patent applications, patents, and other references mentioned herein are incorporated by reference in their entirety to the extent allowed by applicable law and regulations. The self-filling graduated cylinder system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A liquid chemical consumption measuring system for measuring a volume of liquid chemical consumption by a chemical consuming device, comprising:
   a chemical container capable of storing a volume of liquid chemical;
   a graduated cylinder having an interior, wherein the graduated cylinder is comprised of an elongated structure having an upper end, and a lower end opposite of the upper end, and wherein the graduated cylinder includes measurement indicia;
   wherein the graduated cylinder partially extends into the chemical container;
   a first check valve attached to the graduated cylinder near the lower end of the graduated cylinder, wherein the first check valve is adapted to allow a liquid chemical to flow through the first check valve into the graduated cylinder, and wherein the first check valve is adapted to prevent the liquid chemical within the interior of the graduated cylinder from flowing outwardly through the first check valve; and
   a vacuum device fluidly connected to the graduated cylinder, wherein the vacuum device is adapted for reducing the pressure within the graduated cylinder, wherein the vacuum device is comprised of a vacuum bulb.

2. The liquid chemical consumption measuring system of claim 1, wherein the graduated cylinder has a circular cross sectional shape.

3. The liquid chemical consumption measuring system of claim 1, including a chemical inlet line extending into the interior of the graduated cylinder.

4. The liquid chemical consumption measuring system of claim 3, wherein the chemical inlet line is fluidly connected to a chemical consuming device.

5. The liquid chemical consumption measuring system of claim 4, wherein the chemical consuming device is a vehicle wash.

6. The liquid chemical consumption measuring system of claim 3, including a second check valve connected to a lower end of the chemical inlet line.

7. The liquid chemical consumption measuring system of claim 1, wherein the vacuum device is fluidly connected to an upper portion of the graduated cylinder.

8. The liquid chemical consumption measuring system of claim 7, wherein the vacuum device is fluidly connected the graduated cylinder near the upper end of the graduated cylinder.

9. A liquid chemical consumption measuring system for measuring a volume of liquid chemical consumption by a chemical consuming device, comprising:
- a chemical container capable of storing a volume of liquid chemical;
- a graduated cylinder having an interior, wherein the graduated cylinder is comprised of an elongated structure having an upper end, and a lower end opposite of the upper end, and wherein the graduated cylinder includes measurement indicia;
- wherein the graduated cylinder partially extends into the chemical container;
- a first check valve attached to the graduated cylinder near the lower end of the graduated cylinder, wherein the first check valve is adapted to allow a liquid chemical to flow through the first check valve into the graduated cylinder, and wherein the first check valve is adapted to prevent the liquid chemical within the interior of the graduated cylinder from flowing outwardly through the first check valve; and
- a pump device fluidly connected to the graduated cylinder, wherein the pump device is fluidly connected to the chemical container and is adapted to draw liquid chemical from the chemical container and dispense the liquid chemical into the graduated cylinder, wherein the pump device is comprised of a motorized pump.

10. The liquid chemical consumption measuring system of claim 9, wherein the graduated cylinder has a circular cross sectional shape.

11. The liquid chemical consumption measuring system of claim 9, including a chemical inlet line extending into the interior of the graduated cylinder.

12. The liquid chemical consumption measuring system of claim 11, wherein the chemical inlet line is fluidly connected to a chemical consuming device.

13. The liquid chemical consumption measuring system of claim 12, wherein the chemical consuming device is a vehicle wash.

14. The liquid chemical consumption measuring system of claim 11, including a second check valve connected to a lower end of the chemical inlet line.

15. The liquid chemical consumption measuring system of claim 9, wherein the pump device is fluidly connected to an upper portion of the graduated cylinder.

16. The liquid chemical consumption measuring system of claim 15, wherein the pump device is fluidly connected the graduated cylinder near the upper end of the graduated cylinder.

17. A liquid chemical consumption measuring system for measuring a volume of liquid chemical consumption by a chemical consuming device, comprising: a chemical container capable of storing a volume of liquid chemical; a graduated cylinder having an interior, wherein the graduated cylinder is comprised of an elongated structure having an upper end, and a lower end opposite of the upper end, and wherein the graduated cylinder includes measurement indicia; wherein the graduated cylinder partially extends into the chemical container; a first check valve attached to the graduated cylinder near the lower end of the graduated cylinder, wherein the first check valve is adapted to allow a liquid chemical to flow through the first check valve into the graduated cylinder, and wherein the first check valve is adapted to prevent the liquid chemical within the interior of the graduated cylinder from flowing outwardly through the first check valve; and a vacuum device fluidly connected to the graduated cylinder, wherein the vacuum device is adapted for reducing the pressure within the graduated cylinder, wherein the vacuum device is comprised of a electric powered vacuum pump.

18. A liquid chemical consumption measuring system for measuring a volume of liquid chemical consumption by a chemical consuming device, comprising:
- a chemical container capable of storing a volume of liquid chemical;
- a graduated cylinder having an interior, wherein the graduated cylinder is comprised of an elongated structure having an upper end, and a lower end opposite of the upper end, and wherein the graduated cylinder includes measurement indicia;
- wherein the graduated cylinder partially extends into the chemical container;
- a first check valve attached to the graduated cylinder near the lower end of the graduated cylinder, wherein the first check valve is adapted to allow a liquid chemical to flow through the first check valve into the graduated cylinder, and wherein the first check valve is adapted to prevent the liquid chemical within the interior of the graduated cylinder from flowing outwardly through the first check valve;
- a vacuum device fluidly connected to the graduated cylinder, wherein the vacuum device is adapted for reducing the pressure within the graduated cylinder;
- a chemical inlet line extending into the interior of the graduated cylinder; and
- a second check valve connected to a lower end of the chemical inlet line.

19. A liquid chemical consumption measuring system for measuring a volume of liquid chemical consumption by a chemical consuming device, comprising:
- a chemical container capable of storing a volume of liquid chemical;
- a graduated cylinder having an interior, wherein the graduated cylinder is comprised of an elongated structure having an upper end, and a lower end opposite of the upper end, and wherein the graduated cylinder includes measurement indicia;
- wherein the graduated cylinder partially extends into the chemical container;
- a first check valve attached to the graduated cylinder near the lower end of the graduated cylinder, wherein the first check valve is adapted to allow a liquid chemical to flow through the first check valve into the graduated cylinder, and wherein the first check valve is adapted to prevent the liquid chemical within the interior of the graduated cylinder from flowing outwardly through the first check valve; and
- a pump device fluidly connected to the graduated cylinder, wherein the pump device is fluidly connected to the chemical container and is adapted to draw liquid chemical from the chemical container and dispense the liquid chemical into the graduated cylinder;
- a chemical inlet line extending into the interior of the graduated cylinder; and
- a second check valve connected to a lower end of the chemical inlet line.

* * * * *